United States Patent
Nakano et al.

(10) Patent No.: US 11,154,785 B2
(45) Date of Patent: Oct. 26, 2021

(54) GAME SYSTEM AND METHOD OF PROVIDING INFORMATION RELATED TO MATCH-UP GAME

(71) Applicant: BANDAI NAMCO Entertainment Inc., Tokyo (JP)

(72) Inventors: Atsushi Nakano, Tokyo (JP); Sho Aita, Tokyo (JP); Yuki Mizuhori, Tokyo (JP)

(73) Assignee: BANDAI NAMCO Entertainment Inc., Tokyo (JP)

(*) Notice: Subject to any disclaimer, the term of this patent is extended or adjusted under 35 U.S.C. 154(b) by 47 days.

(21) Appl. No.: 16/727,427

(22) Filed: Dec. 26, 2019

(65) Prior Publication Data

US 2020/0206639 A1 Jul. 2, 2020

(30) Foreign Application Priority Data

Dec. 28, 2018 (JP) .............................. JP2018-247739

(51) Int. Cl.
| | |
|---|---|
| A63F 13/795 | (2014.01) |
| A63F 13/798 | (2014.01) |
| A63F 13/5372 | (2014.01) |
| A63F 13/5375 | (2014.01) |

(52) U.S. Cl.
CPC ........ *A63F 13/795* (2014.09); *A63F 13/5372* (2014.09); *A63F 13/798* (2014.09); *A63F 13/5375* (2014.09); *A63F 2300/556* (2013.01); *A63F 2300/558* (2013.01)

(58) Field of Classification Search
CPC .. A63F 13/795; A63F 13/5372; A63F 13/798; A63F 13/5375; A63F 2300/556; A63F 2300/558
See application file for complete search history.

(56) References Cited

U.S. PATENT DOCUMENTS

| | | | | |
|---|---|---|---|---|
| 9,076,292 | B1* | 7/2015 | Berger | A63F 13/60 |
| 2012/0196678 | A1* | 8/2012 | Fujisawa | A63F 13/35 463/33 |
| 2020/0101379 | A1* | 4/2020 | Marr | A63F 13/44 |

FOREIGN PATENT DOCUMENTS

JP 5280712 B2 9/2009

* cited by examiner

*Primary Examiner* — Reginald A Renwick
(74) *Attorney, Agent, or Firm* — Posz Law Group, PLC

(57) ABSTRACT

When a server executes control processing related to a matching match-up using player characters as matched player characters between matched players determined by matching processing, when interference from a matched player character to another matched player character occurs, the server executes parameter control processing with respect to the matched player character having been subjected to the interference in accordance with the interference and executes parameter control disabling processing of disabling control of a parameter value in accordance with the interference by a player character of an unmatched player to the matched player character.

10 Claims, 8 Drawing Sheets

GAME SYSTEM AND METHOD OF PROVIDING INFORMATION RELATED TO MATCH-UP GAME

Japanese Patent Application No. 2018-247739, filed on Dec. 28, 2018, is hereby incorporated by reference in its entirety.

BACKGROUND OF THE INVENTION

The present invention relates to a game system, method of providing information related to match-up game and the like.

Conventionally, action games and shooting games are known, including third-person shooting (TPS) games (third-person shooters) which enable a player to move freely inside a game world or a game space in a game or the like from a third-person perspective of following a player character and fight using a weapon or fight in hand-to-hand combat and first-person shooting (FPS) games (first-person shooters) which enable a player to move freely inside a game world or a game space in a game or the like from a perspective of a player character and fight using a weapon or fight in hand-to-hand combat.

In addition, among such games, there are also known battle royale games or roll playing games (MMORPGs: Massively Multiplayer Online Role-Playing Games) in which a plurality of players or teams participate in a game world of a single game and whichever player or team has managed to continue the game the longest is recognized as a winner.

Furthermore, among game systems that execute such games, game systems are known which match two or more players with one another among participating players and cause the matched players to execute a game in a same game space (for example, Japanese Patent No. 5280712).

However, with the game system described in Japanese Patent No. 5280712, even though an inter-individual match-up is executed with another matched player in a space free of interference from other players, further ingenuity is required to apply such a mechanism to a match-up game that is advanced by executing match-ups in an omnidirectional manner with other player characters who are present in a same game space.

SUMMARY

The invention can provide a game system and the like which are capable of improving an entertainment level of a match-up game among a plurality of players by increasing a frequency of match-ups between players during the match-up game to invigorate the game while eliminating influences from unmatched players during a matching match-up.

According to a first aspect of the invention, there is provided a game system which executes a match-up game among a plurality of players using player characters set in a game space and which provides a terminal with information related to the match-up game, the game system including a processor, programmed to:

execute parameter control processing of controlling a given parameter value stored in storage for each player character of each player in accordance with interference from the player character of another player during the execution of the match-up game;

execute matching processing at a given timing during the execution of the match-up game, the matching processing involving (A) matching at least two or more players or player groups from the plurality of players or a plurality of player groups constituted by the plurality of players, and determining the players or the player groups who have been matched as matched players or (B) matching at least two or more player characters or player character groups from a plurality of the player characters or a plurality of player character groups constituted by the plurality of player characters, and determining the player characters or player character groups who have been matched as matched player characters;

execute, as matching match-up control processing, (a) control processing related to a match-up that uses the player characters as matched player characters between matched players determined by the matching processing or (b) control processing related to the match-up that uses matched player characters determined by the matching processing;

when interference from one of the matched player characters to another matched player character occurs during the execution of the matching match-up control processing, execute the parameter control processing with respect to the matched player character having been subjected to the interference in accordance with the interference; and execute parameter control disabling processing of disabling control of the parameter value in accordance with the interference to the matched player character from the player character of an unmatched player who differs from the matched player during the execution of the match-up control processing.

According to a second aspect of the invention, there is provided a method of executing a match-up game among a plurality of players using player characters set in a game space and providing a terminal with information related to the match-up game, the method of providing information related to a match-up game including:

executing parameter control processing of controlling a given parameter value stored in storage for each player character of each player in accordance with interference from the player character of another player during the execution of the match-up game;

executing matching processing at a given timing during the execution of the match-up game, the matching processing involving (A) matching at least two or more players or player groups from the plurality of players or a plurality of player groups constituted by the plurality of players, and determining the players or the player groups who have been matched as matched players or (B) matching at least two or more player characters or player character groups from a plurality of the player characters or a plurality of player character groups constituted by the plurality of player characters and determining the player characters or player character groups who have been matched as matched player characters;

executing, as matching match-up control processing, (a) control processing related to a match-up that uses the player characters as matched player characters between matched players determined by the matching processing or (b) control processing related to the match-up that uses matched player characters determined by the matching processing;

when interference from one of the matched player characters to another matched player character occurs during the execution of the matching match-up control processing, executing the parameter control processing with respect to the matched player character having been subjected to the interference in accordance with the interference; and executing parameter control disabling processing of disabling control of the parameter value in accordance with the interference to the matched player character from the player character of an unmatched player who differs from the matched player during the execution of the match-up control processing.

According to a third aspect of the invention, there is provided a game system which executes a match-up game among a plurality of players using player characters set in a game space, the game system including a processor programmed to:

execute parameter control processing of controlling a given parameter value stored in storage for each player character of each player in accordance with interference from the player character of another player during the execution of the match-up game, execute matching processing at a given timing during the execution of the match-up game, the matching processing involving (A) matching at least two or more players or player groups from the plurality of players or a plurality of player groups constituted by the plurality of players, and determining the players or the player groups who have been matched as matched players or (B) matching at least two or more player characters or player character groups from a plurality of the player characters or a plurality of player character groups constituted by the plurality of player characters and determining the player characters or player character groups who have been matched as matched player characters;

execute, as matching match-up control processing, (a) control processing related to a match-up that uses the player characters as matched player characters between matched players determined by the matching processing or (b) control processing related to the match-up that uses matched player characters determined by the matching processing, when interference from one of the matched player characters to another matched player character occurs during the execution of the matching match-up control processing, the game system execute the parameter control processing with respect to the matched player character having been subjected to the interference in accordance with the interference, and the game system execute parameter control disabling processing of disabling control of the parameter value in accordance with the interference to the matched player character from the player character of an unmatched player who differs from the matched player during the execution of the match-up control processing.

Figure 1:
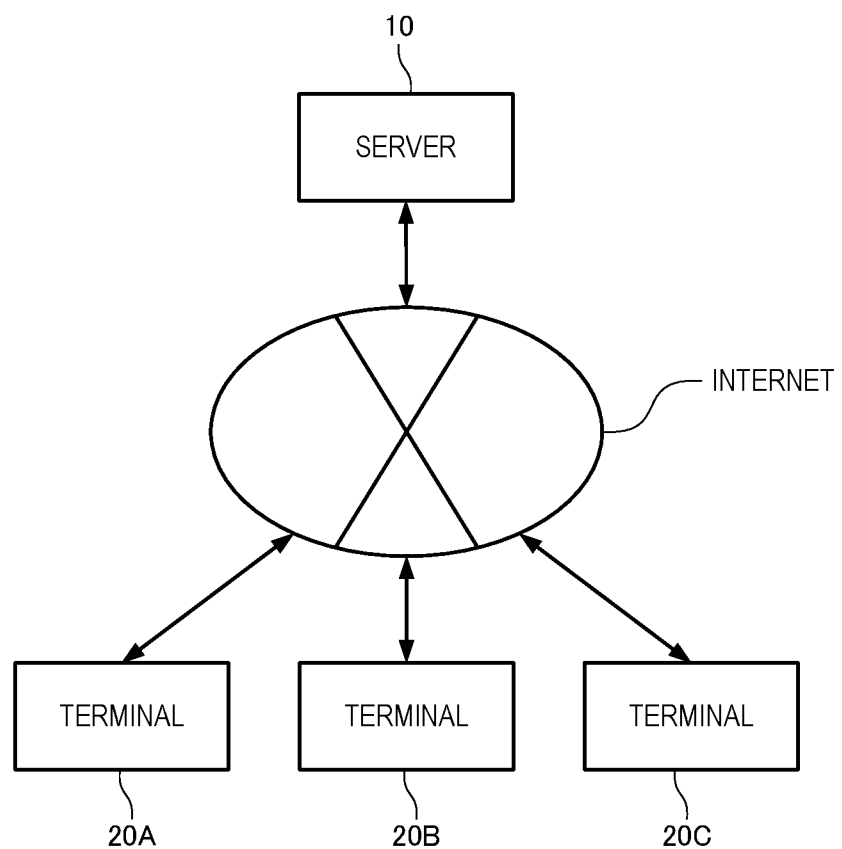
FIG. 1 is a diagram illustrating an example of a system configuration representing a configuration of a game system according to an embodiment of the invention.

DETAILED DESCRIPTION OF THE EMBODIMENT (1) According to an embodiment of the invention, there is provided a game system which executes a match-up game among a plurality of players using player characters set in a game space and which provides a terminal with information related to the match-up game, the game system including a processor, the processor executing parameter control processing of controlling a given parameter value stored in storage for each player character of each player in accordance with interference from a player character of another player during the execution of the match-up game, a processor programmed to:

execute parameter control processing of controlling a given parameter value stored in storage for each player character of each player in accordance with interference from the player character of another player during the execution of the match-up game;

execute matching processing at a given timing during the execution of the match-up game, the matching processing involving (A) matching at least two or more players or player groups from the plurality of players or a plurality of player groups constituted by the plurality of players, and determining the players or the player groups who have been matched as matched players or (B) matching at least two or more player characters or player character groups from a plurality of the player characters or a plurality of player character groups constituted by the plurality of player characters, and determining the player characters or player character groups who have been matched as matched player characters;

execute, as matching match-up control processing, (a) control processing related to a match-up that uses the player characters as matched player characters between matched players determined by the matching processing or (b) control processing related to the match-up that uses matched player characters determined by the matching processing;

when interference from one of the matched player characters to another matched player character occurs during the execution of the matching match-up control processing, execute the parameter control processing with respect to the matched player character having been subjected to the interference in accordance with the interference; and execute parameter control disabling processing of disabling control of the parameter value in accordance with the interference to the matched player character from the player character of an unmatched player who differs from the matched player during the execution of the match-up control processing.

The game system described above is capable of controlling a match-up between matched player characters (in other words, between matched players) free from interference by unmatched player characters who have not been matched.

For example, in a battle royale match-up game to be executed by a plurality of players, during execution of a matching match-up that involves a match-up with another matched player or another matched player character, the game system described above can enable a matched player or a matched player character to concentrate on the matching match-up without being interfered with (specifically, attacked) by a player character (hereinafter, referred to as an "unmatched player character") of another player (hereinafter, referred to as an "unmatched player") who is not participating in the matching match-up.

Therefore, since the game system described above can eliminate influences from unmatched player characters during a matching match-up, a frequency of match-ups between players during a match-up game can be increased to invigorate the game and, consequently, an entertainment level of the game can be improved.

It should be noted that match-up games include a battle game in which a battle or hand-to-hand combat with an enemy character or another player character is performed, an action game, an RPG, a sound game, and a sport game which involve inter-individual match-ups or inter-group match-ups.

In addition, being "set in a game space" includes, for example, being set in a game field formed in a virtual space such as a three-dimensional space or a two-dimensional space.

Furthermore, "interference" includes, in addition to an attack in a battle game, performing an action that influences another player or player character such as interfering with another player or player character in a game that involves a player matching up with another.

Moreover, a "parameter value" indicates, for example, a value of a parameter set to a player or a player character.

For example, a "parameter value" includes a level or an attribute of a player (including a team to which a plurality of players belong) or a player character, earned experience points (including lives and points), in-game currency, and a value of a parameter that defines capabilities or characteristics of a player character. However, while the parameter value is preferably a value of a parameter that defines a winner or a loser of a game, the parameter value is not limited thereto.

In addition to the above, a "given timing" includes a timing at which an instruction based on a game program (in other words, an instruction from a computer) in accordance with game progress is executed, a timing at which a given event has occurred, and a timing at which a given condition is satisfied besides an instruction from a player.

Furthermore, "a timing at which a given condition is satisfied" includes a timing at which an attack by another player or player character is started, a timing at which a predetermined item is acquired or used, and a timing at which a value of a parameter determined in advance such as points or experience points satisfies a condition determined in advance.

Moreover, "matching at least two or more players (or player characters)" need only involve two or more players (or player characters) and includes matching two players (or player characters) or three players (or player characters) as well as matching two or more teams respectively constituted by a plurality of players (or player characters).

In addition, for example, the "parameter control processing" includes processing of reducing a parameter value such as life energy of a player character having sustained an attack with respect to an attack from another player character (for example, based on hit points) and processing of increasing a parameter value such as life energy of a player character having been subjected to an application of recovery processing with respect to recovery processing from another player character.

Furthermore, the "parameter control disabling processing" need only be processing of disabling control of a parameter value, and examples thereof include:

(A1) interference inhibiting processing of preventing an occurrence of interference itself from an unmatched player character (in other words, a player character of a third-person player who is outside of control by the matching match-up control processing) to a matched player character; and (A2) interference disabling processing of disabling the interference even when the interference occurs such that a parameter value does not fluctuate.

In particular, the interference inhibiting processing includes processing of arranging, during a matching match-up of a matched player character, an obstacle object that inhibits entry by an unmatched player character to a periphery of the matched player character or processing for causing a matching match-up to be executed in a game space that differs from a game space in which a plurality of player characters are engaged in a match-up.

In addition, the interference disabling processing includes processing which enables interference (an attack or an obstruction) from an unmatched player character to a matched player character in accordance with a hit determination or the like but prevents a parameter value from fluctuating in cases other than interference to the matched player character such as processing of making the matched player character invincible from an unmatched player character.

Furthermore, the "matching processing" is executed in accordance with a type or a level of a player character, in accordance with a parameter value such as offensive capability, defensive capability, or an attribute, in accordance with equipment of the player character, or in accordance with a previous match-up history of a player.

In addition, in the "matching match-up control processing", various processes for continuously executing match-ups with respect to a status prior to matching such as the number of or types of items or points may be executed or an individual matching match-up control processing such as limiting items used by a player with an extensive match-up history (the number of match-ups) may be executed.

Furthermore, in addition to control processing of a match-up between matched players (in other words, between matched player characters), the "matching match-up control processing" may include:

(B1) processing for blocking interference such as an attack from an unmatched player character for a certain period of time after the end of a matching match-up;

(B2) processing of awarding a specific item or points (including experience points and in-game currency) to a winning matched player or a winning matched player character after a matching match-up; and (B3) processing of enabling a winning matched player to exclusively and preferentially acquire equipment of a losing matched player (including automatically acquiring the equipment and choosing and acquiring only equipment desired by the winning matched player) after a matching match-up or processing of providing a period in which the equipment can be preferentially acquired (after the equipment is acquired, the equipment may be presented to an unmatched player).

(2) In the game system described above, the processor may be programmed to execute the parameter control disabling processing that involves:

generating a matching match-up region in which the matched player characters are present and from which the unmatched player character has been excluded in the game space; and disabling at least one kind of processing of movement control processing and influence control processing, the movement control processing controlling a movement of an object from a non-matching match-up region that differs from the matching match-up region to the matching match-up region in the game space, the influence control processing controlling exercise of influence from the non-matching match-up region to the matching match-up region in the game space.

Since the game system described above can eliminate influences from unmatched player characters during a matching match-up, a frequency of match-ups between players (in other words, between player characters) during a match-up game can be increased to invigorate the game and, consequently, an entertainment level of the game can be improved.

It should be noted that, as a general rule, the "matching match-up region" and the "non-matching match-up region" are continuously set in a same game space. However, this is not restrictive.

In addition, for example, a "movement of an object" is not limited to a player character and includes a movement of an object capable of moving in a game space such as a bullet or an automobile.

Furthermore, "exercise of influence" indicates, for example, an action for directly imparting given influence from a non-matching match-up region to a matched player character using a capability set to a player character such as magic or a supernatural power without moving any object from the non-matching match-up region to the matching match-up region.

Moreover, the gist of "disabling at least one of a movement of an object from a non-matching match-up region to a matching match-up region and exercise of influence" is to regulate a unidirectional movement or the like of an object from the non-matching match-up region to the matching match-up region and may or may not be disabled during a movement of an object or exercise of influence from the matching match-up region to the non-matching match-up region.

In addition to the above, when an unmatched player character is present in a "matching match-up region" at the time of generation thereof, the unmatched player character may be rearranged to a non-matching match-up region or the unmatched player character may be set as a matched player character.

(3) In the game system described above, the processor may be programmed to cause the terminal to display the matching match-up region in order to distinguish from other regions in the game space.

Therefore, since the game system described above enables a strategy in accordance with intentions of a player to be drawn, an entertainment level of the game can be improved.

It should be noted that "causing the terminal to display the matching match-up region so as to be distinguishable from other regions in the game space" indicates coloring or decorating the matching match-up region in a specific color or displaying the matching match-up region so as to be distinguishable using a text.

(4) In the game system described above, the processor may be programmed to end the matching match-up control processing and the parameter control disabling processing when a given matching match-up end condition is satisfied during the execution of the matching match-up control processing.

For example, the game system described above can end the matching match-up control processing and the parameter control disabling processing in the following cases:

(C1) when an outcome of a matching match-up is decided (when any matched player character wins (including a case where the other matched player character becomes incapacitated));

(C2) in a case of a match-up between groups respectively formed by a plurality of matched player characters, when any of the groups wins (including a case where all of or a part of matched player characters belonging to any of the groups become incapacitated);

(C3) when a matching match-up can no longer be advanced (such as when both matched player characters become incapacitated due to attacks simultaneously sustained by both matched player characters or the like);

(C4) when a predetermined period of time elapses from start of the matching match-up control processing; or (C5) when the matching match-up end condition is satisfied such as when a predetermined event is executed (such as when a matched player character flees).

Therefore, since the game system described above can start and end a matching match-up during the progress of a match-up game, the game system described above can provide a matching match-up as an aspect of the match-up game.

As a result, the game system described above can increase a strategic property of a match-up game and improve an entertainment level of the game.

(5) In the game system described above, the processor may be programmed to rearrange, when the matching match-up control processing ends, the matched player characters at a position that differs from a position in the game space where the matching match-up based on the matching match-up control processing had been executed.

For example, when a partial region in the game space is a matching match-up region and the matching match-up control processing ends, the game system described above can enable the matched player character to avoid interference from an unmatched player character who is present in a non-matching match-up region in a periphery of the matching match-up region, or when a matching match-up is being executed in a space that differs from the game space, the game system described above can enable the matched player character to return to the game space.

In other words, the game system described above is capable of preventing a disadvantage immediately after the end of a matching match-up or executing processing for continuing a game in a smooth manner.

It should be noted that a "position in the game space where a matching match-up had been executed" includes a position in a game space that differs from a game space where a match-up game is to be executed as well as a position in a game space that is the same as the game space where a match-up game is to be executed.

In addition, a "position that differs from a position in the game space where a matching match-up had been executed" includes a position in a game space that differs from a game space where a matching match-up had been executed to begin with as well as a different position in the game space where a match-up game is to be executed.

(6) In the game system described above, the processor may be programmed to execute the matching match-up control processing with the matched players or the matched player characters determined by the matching processing based on an application by a match-up-requesting player who requests the match-up between the matched players who have been matched or between the matched players indicating players who operate the matched player characters.

Since the game system described above is capable of realizing a matching match-up between specific players or specific player characters in accordance with an application from a player, a player can actively set up a match-up with another player or another player character.

Therefore, since the game system described above enables each player to expand a width of strategies in a match-up game, an entertainment level of the game can be improved.

It should be noted that "executing matching match-up control processing . . . based on an application by a match-up-requesting player" includes forcibly executing a matching match-up in response to an application by a match-up-requesting player as well as executing the matching match-up control processing under the consent by a matched player having been matched by the matching processing or a player who operates a matched player character having been matched by the matching processing in addition to the application by a match-up-requesting player.

In addition, when a plurality of applications are made at a same timing, matching match-up control processing is executed in accordance with a relationship (a relationship between levels or a difference in capabilities) between the match-up-requesting player and another matched player or a matched player character who has been matched, or one matched player (one group of matched players) or one matched player character (one group of matched player characters) is randomly determined and matching match-up control processing with the determined matched player or the determined matched player character is executed.

Furthermore, in the case of a matching match-up between player groups or between player character groups, a configuration may be adopted in which either an application can only be made by a player determined as a leader of a matched player group (in other words, a team) or an application can be made from any of the players belonging to the team.

Moreover, with respect to an "application", a configuration may be adopted in which either an application can be made anytime during a game or a predetermined period is set when a predetermined condition is satisfied (when player characters of a same team lose in a team match-up) and an application is only accepted during this period.

(7) In the game system described above, the processor may be programmed to:

execute determination processing of determining whether or not a given match-up feasible condition is satisfied, the given match-up feasible condition being based on a relationship between the match-up-requesting player and another matched player who has been matched, or a relationship between the player group to which the match-up-requesting player belongs and another matched player group which has been matched; and when it is determined in the determination processing that the match-up feasible condition is not satisfied, execute suspension processing of suspending the matching match-up control processing in order to suspend the matched match-up, or execute inquiry processing for making an inquiry to at least any one of the match-up-requesting player and the other matched player about whether or not the matching match-up is to be executed.

The game system described above is capable of preventing a match-up from becoming one-sided by, for example, allowing a matching match-up to proceed in the case of players with similar levels and disallowing a matching match-up from proceeding in the case of players with a difference in levels or capabilities.

Therefore, the game system described above is capable of causing an intention of each player to be reflected on a matching match-up by preventing a disadvantage to each player in advance or enabling each player to choose whether or not to disallow the matching match-up from proceeding based on the intention of the player.

As a result, since the game system described above is capable of maintaining an entertainment level of each player or enables a strategy in accordance with intentions of a player to be drawn, an entertainment level of the game can be improved.

It should be noted that in the case of a matching match-up between player groups, a configuration may be adopted in which only a player determined as a team leader is queried about whether or not the matching match-up is to proceed or any of the players belonging to the team is allowed to make an inquiry about whether or not the matching match-up is to be executed.

(8) In the game system described above, the processor may be programmed to change, as the matching match-up control processing, a type or contents of the match-up game in the matching match-up in accordance with a type of the matched player or the matched player character, or in accordance with a parameter value.

Since the game system described above is capable of performing various matching match-ups, an entertainment level of the game can be improved.

For example, the game system described above executes a matching match-up with an unlimited period in the case of matched players or matched player characters of similar levels and executes a matching match-up with a short period when there is a large difference in levels.

In addition, when performing a matching match-up when there is a large difference in levels, the game system described above is capable of executing the matching match-up after applying pre-processing for preventing the match-up from becoming one-sided such as awarding an item for bridging the gap between levels.

For example, a "type of a match-up game" includes a type of a game itself such as a type of a duel game or a match-up in a music game.

Furthermore, "contents of a match-up game" includes a weapon to be used in a matching match-up, a rule for determining an outcome, an amount of damage with respect to an attack, an item or equipment to be lent, a capability to be imparted, a background, a type of stage, a game period, and whether or not parameter control disabling processing is to be disabled with respect to only one matched player (for example, a player with high capabilities) or only one matched player character (for example, a player character with high capabilities).

(9) According to an embodiment of the invention, there is provided a method of executing a match-up game among a plurality of players using player characters set in a game space and providing a terminal with information related to the match-up game, the method of providing information related to a match-up game including: executing parameter control processing of controlling a given parameter value stored in storage for each player character of each player in accordance with interference from the player character of another player during the execution of the match-up game;

executing matching processing at a given timing during the execution of the match-up game, the matching processing involving (A) matching at least two or more players or player groups from the plurality of players or a plurality of player groups constituted by the plurality of players, and determining the players or the player groups who have been matched as matched players or (B) matching at least two or more player characters or player character groups from a plurality of the player characters or a plurality of player character groups constituted by the plurality of player characters and determining the player characters or player character groups who have been matched as matched player characters;

executing, as matching match-up control processing, (a) control processing related to a match-up that uses the player characters as matched player characters between matched players determined by the matching processing or (b) control processing related to the match-up that uses matched player characters determined by the matching processing;

when interference from one of the matched player characters to another matched player character occurs during the execution of the matching match-up control processing, executing the parameter control processing with respect to the matched player character having been subjected to the interference in accordance with the interference; and executing parameter control disabling processing of disabling control of the parameter value in accordance with the interference to the matched player character from the player character of an unmatched player who differs from the matched player during the execution of the match-up control processing.

The method of providing information related to a match-up game described above is capable of controlling a match-up between matched players without being influenced by unmatched player characters who have not been matched.

For example, in a battle royale match-up game to be executed by a plurality of players, during execution of a matching match-up that involves a match-up with another matched player, the method of providing information related to a match-up game described above can enable a matched player or a matched player character to concentrate on the matching match-up without being interfered with (specifically, attacked) by a player character (hereinafter, referred to as an "unmatched player character") of another player (hereinafter, referred to as an "unmatched player") who is not participating in the matching match-up.

Therefore, since the method of providing information related to a match-up game described above can eliminate influences from unmatched players during a matching match-up, a frequency of match-ups between players during a match-up game can be increased to invigorate the game and, consequently, an entertainment level of the game can be improved.

(10) According to an embodiment of the invention, there is provided a game system which executes a match-up game among a plurality of players using player characters set in a game space, the game system including a processor, programmed to:

execute parameter control processing of controlling a given parameter value stored in storage for each player character of each player in accordance with interference from the player character of another player during the execution of the match-up game, execute matching processing at a given timing during the execution of the match-up game, the matching processing involving (A) matching at least two or more players or player groups from the plurality of players or a plurality of player groups constituted by the plurality of players, and determining the players or the player groups who have been matched as matched players or (B) matching at least two or more player characters or player character groups from a plurality of the player characters or a plurality of player character groups constituted by the plurality of player characters and determining the player characters or player character groups who have been matched as matched player characters;

execute, as matching match-up control processing, (a) control processing related to a match-up that uses the player characters as matched player characters between matched players determined by the matching processing or (b) control processing related to the match-up that uses matched player characters determined by the matching processing, when interference from one of the matched player characters to another matched player character occurs during the execution of the matching match-up control processing, the game system execute the parameter control processing with respect to the matched player character having been subjected to the interference in accordance with the interference, and the game system execute parameter control disabling processing of disabling control of the parameter value in accordance with the interference to the matched player character from the player character of an unmatched player who differs from the matched player during the execution of the match-up control processing.

The game system described above is capable of controlling a match-up between matched players free from an intervention by unmatched player characters who have not been matched.

For example, in a battle royale match-up game to be executed by a plurality of players, during execution of a matching match-up that involves a match-up with another matched player, the game system described above can enable a matched player or a matched player character to concentrate on the matching match-up without being interfered with (specifically, attacked) by a player character (hereinafter, referred to as an "unmatched player character") of another player (hereinafter, referred to as an "unmatched player") who is not participating in the matching match-up.

Therefore, since the game system described above can eliminate influences from unmatched players during a matching match-up, a frequency of match-ups between players during a match-up game can be increased to invigorate the game and, consequently, an entertainment level of the game can be improved.

Embodiments of the invention are described in detail below. It is noted that the following embodiments do not unduly limit the scope of the invention as stated in the claims. In addition, all of the components described in the following embodiments are not necessarily essential requirements of the invention.

1. Game System

First, an overview and a general configuration of a game system 1 according to an embodiment of the invention will be described with reference to FIG. 1. FIG. 1 is a diagram illustrating an example of a system configuration representing a configuration of the game system 1.

In the game system 1, as illustrated in FIG. 1, a server 10 which provides a game service and a terminal 20 (for example, terminals 20A, 20B, and 20C) are configured to be connectable to the Internet (an example of a network).

By accessing the server 10 from the terminal 20, a user can play a game being transmitted from the server 10 via the Internet. Furthermore, by accessing the server 10 from the terminal 20, the user can communicate with other users.

The server 10 is an information processing apparatus capable of providing a service that enables users to play a game using the terminal 20 connected to the server 10 via the Internet so as to be capable of communicating with the server 10. In addition, the server 10 may function as an SNS server which provides a communication-type service. In this case, an SNS server may be an information processing apparatus which provides a service that enables a plurality of users to communicate with each other.

Furthermore, for example, when the server 10 functions as an SNS server, the server 10 is capable of providing a game referred to as a social game which is executed using an operating environment (an application programming interface (API), a platform, or the like) of the SNS to be provided.

In particular, the server 10 is capable of providing games provided on a web browser of the terminal 20 including browser games (games which start by simply opening an installation site with a web browser) created in various languages such as HTML, FLASH, CGI, PHP, shockwave, a Java (registered trademark) applet, and JavaScript (registered trademark).

Social games differ from existing online games in that dedicated client software is not required, and include games that can be played with only a web browser and an SNS account. In addition, the server 10 is configured to be capable of being connected to a terminal (a smart phone, a personal computer, a game device, or the like) of another user via a network and providing an online game which enables a same game progress to be simultaneously shared online.

Meanwhile, the server 10 may be constituted by one (apparatus or processor) or a plurality of (apparatuses or processors).

In addition, information such as billing information and game information stored in a storage area (a storage unit 140 to be described later) of the server 10 may be stored in a database (a storage apparatus or a memory in a broad sense) connected via a network (an intranet or the Internet) or, when the server 10 functions as an SNS server, information such as a player information storage unit 146 stored in the storage area may be stored in a database (a storage apparatus or a memory in a broad sense) connected via a network (an intranet or the Internet).

Specifically, the server 10 is configured to receive input information based on an operation by a user (in other words, a player executing a game) of the terminal 20 and to perform game processing based on the received input information. In addition, the server 10 is configured to transmit a game processing result to the terminal 20, and the terminal 20 is configured to perform various types of processing so as to provide the game processing result received from the server 10 on the terminal 20 so as to be viewable for the user.

The terminal 20 is an information processing apparatus such as an image generating apparatus including a smart phone, a mobile phone, a PHS, a computer, a game apparatus, a PDA, and a mobile game device, and is capable of being connected to the server 10 via a network such as the Internet (a WAN) or a LAN. A communication line between the terminal 20 and the server 10 may be either wired or wireless.

In addition, the terminal 20 is provided with a web browser capable of viewing web pages (data in an HTML format). In other words, the terminal 20 is equipped with a communication control function for communicating with the server 10, a web browser function for performing display control using data (web data, data created in the HTML format, and the like) received from the server 10 and transmitting data of a user's operation to the server 10, and the like, and is configured to execute various types of processing in order to provide the user with a game screen and enable the user to execute a game. However, the terminal 20 may acquire game control information provided by the server 10 and execute predetermined game processing, and execute a game based on the game processing.

Specifically, when the terminal 20 makes a request to perform a predetermined game to the server 10, the terminal 20 is connected to a game site of the server 10 and a game is started. In particular, by using an API as necessary, the terminal 20 is configured to cause the server 10 functioning as an SNS server to perform predetermined processing or acquire the player information storage unit 146 managed by the server 10 functioning as an SNS server to execute a game.

2. Server

Figure 2:
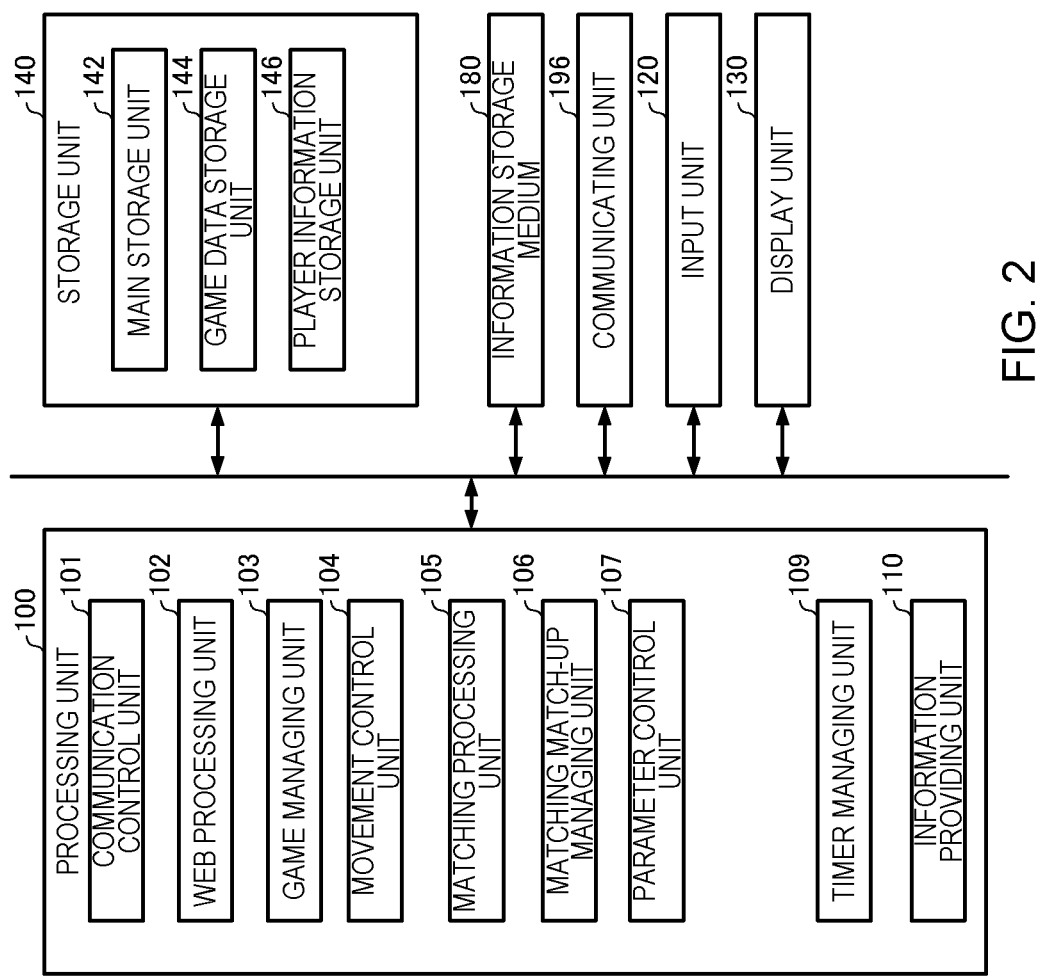
FIG. 2 is a diagram illustrating functional blocks of a server according to the embodiment of the invention.

Next, the server 10 will be described with reference to FIG. 2. Moreover, FIG. 2 is a diagram illustrating functional blocks of the server 10. Alternatively, a part of the components (units) illustrated in FIG. 2 in the server 10 may be omitted.

The server 10 includes an input unit 120 used by an administrator or the like for input, a display unit 130 which performs predetermined display, an information storage medium 180 storing predetermined information, a communicating unit 196 for communicating with the terminal 20 and the like, a processing unit 100 which executes processing mainly related to a game to be provided, and the storage unit 140 storing a variety of data mainly used in the game.

The input unit 120 is used by a system administrator and the like to input settings related to a game and other necessary settings and to input data. For example, the input unit 120 is constituted by a mouse, a keyboard, or the like.

The display unit 130 is for displaying an operation screen for the system administrator. For example, the display unit 130 is constituted by a liquid crystal display or the like.

The information storage medium 180 (a computer-readable medium) stores a program, data, and the like, and a function of the information storage medium 180 is constituted by an optical disk (a CD or a DVD), a magneto-optical disk (MO), a magnetic disk, a hard disk, a magnetic tape, a memory (a ROM), or the like.

The communicating unit 196 performs various control for communicating with the outside (for example, a terminal, another server, or another network system), and a function of the communicating unit 196 is constituted by various processors, hardware such as a communication ASIC, a program, or the like.

The storage unit 140 serves as a work area for the processing unit 100, the communicating unit 196, and the like, and a function of the storage unit 140 is constituted by a RAM (VRAM) or the like. Moreover, information stored in the storage unit 140 may be managed by a database.

Furthermore, in addition to a main storage unit 142, the storage unit 140 has a game data storage unit 144 which stores game information indicating information related to a game and the player information storage unit 146 which stores player information indicating information related to each player and information related to the game of a player (hereinafter, referred to as "player-related information").

In particular, the game data storage unit 144 stores information on a game field where the game is carried out, condition information used to make various determinations, information on each object on the game field, information for changing each object, various table information, information related to a player character of each player, and the like.

In addition, the player information storage unit 146 stores, for each player, the following:

(A1) a nickname or a player ID of a player and, when the player belongs to a team, a team name or an ID of the team to which the player belongs (hereinafter, referred to as "affiliation information");

(A2) information related to a record of an individual and a team such as current points, acquired awards, or game time (hereinafter, also referred to as "record information");

(A3) characteristics and attributes of a player character and information related to types of items owned by the player character (including capabilities of the items);

(A4) information related to a match-up record such as the numbers of wins and losses against another player character or another team in a match-up game with the other player character or the other team (hereinafter, also referred to as "match-up record information");

(A5) positional information indicating a position of each player or team in a game field;

(A6) information on a value of a parameter (hereinafter, referred to as an "energy parameter information") which has a direct bearing on whether a player character of each player wins or loses such as an experience value or life energy (herein after, also referred to as "energy parameter value") and information on presence or absence of a loss (whether or not the game is over) (also referred to as "loss information"); and (A7) information related to billing such as a billing history and a billed amount.

It should be noted that that the record information, the match-up record information, and the loss information included in the player information are updated at a timing determined in advance. Examples of the timing determined in advance include every given period (such as every 5 minutes), a timing at which a player logs out, a predetermined time of day (for example, 8:00 AM) in the game, and a timing at which a predetermined event occurs (a timing at which any inter-individual match-up or inter-team match-up ends).

In addition, basically, energy parameter information decreases in real time when interference such as an attack is sustained from another player character during a game and increases in real time when a recovery action such as eating a meal or getting rest is performed. Furthermore, energy parameter information is information which, when a value thereof reaches "0", the game being played by the player is over.

The processing unit 100 performs a variety of processing using the main storage unit 142 inside the storage unit 140 as a work area. Functions of the processing unit 100 can be realized by hardware such as various processors (a CPU, DSP, or the like) and an ASIC (a gate array or the like) or by programs.

The processing unit 100 performs various types of processing based on the program (data) stored in the information storage medium 180. In other words, the information storage medium 180 stores a program that causes a computer to function as each unit (a program which causes a computer to execute processing of each unit) of the present embodiment.

For example, the processing unit 100 (processor) performs, based on a program stored in the information storage medium, overall control of the server 10 as well as a variety of processing including control of delivery of data and the like between the respective units. Furthermore, the processing unit 100 performs processing for providing various services in response to a request from the terminal 20.

Specifically, the processing unit 100 at least includes a communication control unit 101, a web processing unit 102, a game managing unit 103, a movement control unit 104, a matching processing unit 105, a matching match-up managing unit 106, a parameter control unit 107, a timer managing unit 109, and an information providing unit 110.

The communication control unit 101 performs processing for transmitting and receiving data to and from the terminal 20 via the network. In other words, the server 10 performs a variety of processing based on information received by the communication control unit 101 from the terminal 20 and the like. In particular, the communication control unit 101 performs processing for transmitting, based on a request from the terminal 20 of a player, a game screen to the terminal 20 of the player.

The web processing unit 102 functions as a web server. For example, the web processing unit 102 performs, through a communication protocol such as Hypertext Transfer Protocol (HTTP), processing for transmitting data in response to a request by a web browser 211 installed on the terminal 20 and processing for receiving data transmitted by the web browser 211 of the terminal 20.

Moreover, while a case where the server 10 is also provided with a function as an SNS server will be described as an example according to the present embodiment, the server 10 may be separately formed as a game server and a server for SNS. In addition, the server 10 may perform a part of or all of processing of a game according to the present embodiment or the terminal 20 may perform a part of the processing of the game according to the present embodiment.

The game managing unit 103 constructs a game space as a virtual space in conjunction with the terminal 20, and based on an operation by a player input via the terminal 20, executes various kinds of game processing related to various match-up games including a battle game in which a match-up among a plurality of players involves battle or hand-to-hand combat, an action game, an RPG, a sound game, and a sport game.

In addition, during execution of a match-up game, the game managing unit 103 executes game processing related to a match-up such as battle between individuals or between groups (hereinafter, referred to as an "inter-individual match-up" or an "inter-group match-up").

The movement control unit 104 controls movement inside a game space of a player character (hereinafter, also referred to as an "object player character") to be an operation object of each player to participate in a game in accordance with an operation input by the player to the terminal 20.

The matching processing unit 105 determines, during a match-up game, a player (hereinafter, referred to as a "matched player") or a player character to be an object of an inter-individual match-up or an inter-group match-up.

In conjunction with the game managing unit 103, the matching match-up managing unit 106 executes the following as matching match-up control processing:

(B1) control processing related to an inter-individual match-up and an inter-group match-up (hereinafter, referred to as a "matching match-up") using player characters as matched player characters between matched players determined by matching processing; or (B2) control processing related to a matching match-up using matched player characters determined by matching processing.

The parameter control unit 107 executes parameter control processing of controlling a given parameter value (in other words, an energy parameter value) stored in the player information storage unit 146 in accordance with interference such as an attack from a player character of another player to a match-up game including a matching match-up.

The timer managing unit 109 has a timer function and is used in order to manage a progress status of the game. In particular, the timer managing unit 109 works in conjunction with the game managing unit 103 and outputs a current time of day and a time of day set in advance to each unit. In addition, the timer managing unit 109 is used to synchronize with each terminal.

The information providing unit 110 generates various kinds of game information that enables the terminal 20 to process a game and provides the terminal 20 with the generated game information.

In particular, the information providing unit 110 generates information (in other words, game information) that enables each player's object player character to be controlled by the terminal 20 concerned and provides the generated game information to the terminal 20 concerned.

3. Terminal

Figure 3:
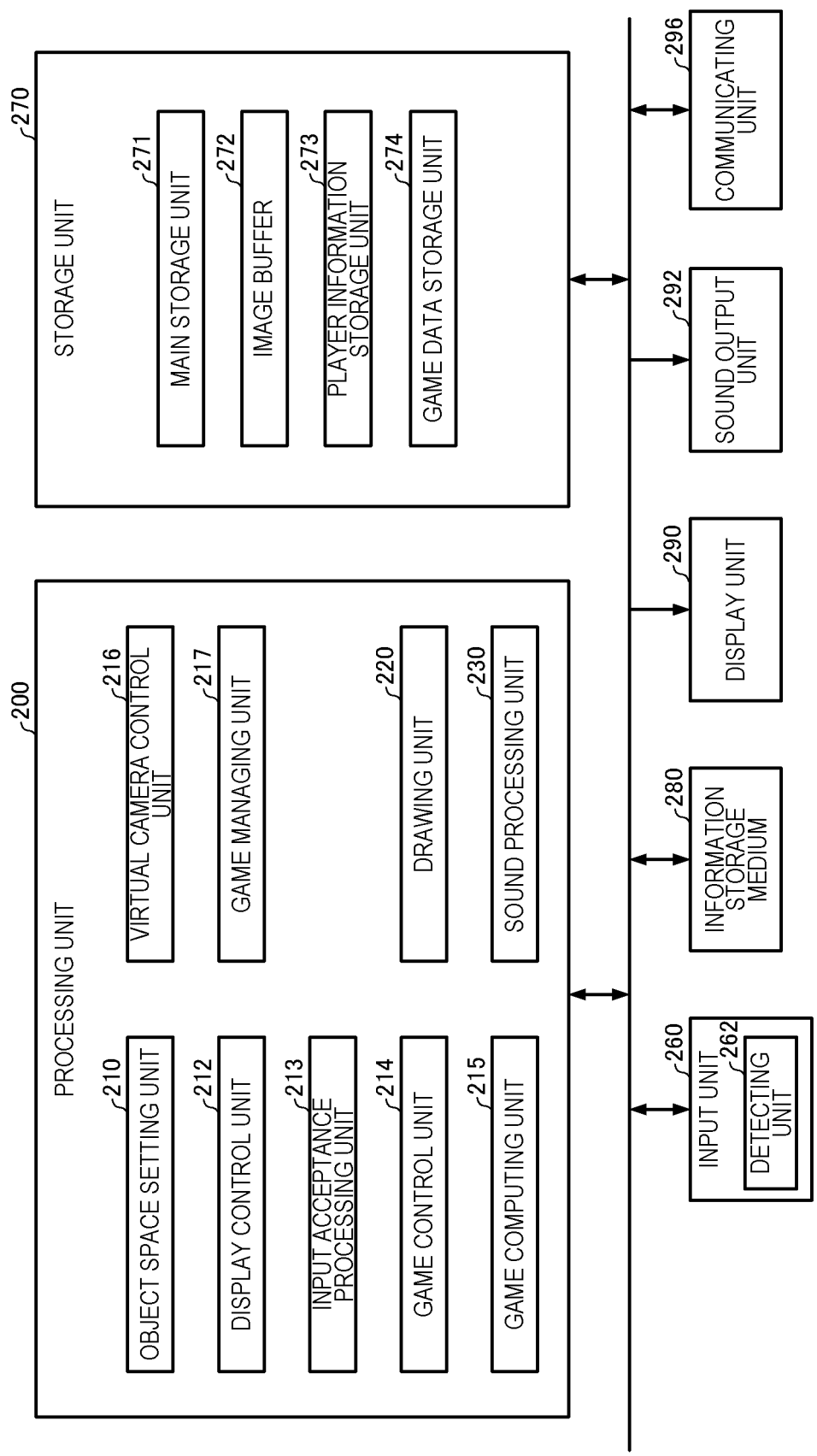
FIG. 3 is a diagram illustrating functional blocks of a terminal according to the embodiment of the invention.

Next, the terminal 20 will be described with reference to FIG. 3. Moreover, FIG. 3 is an example of a functional block diagram illustrating a configuration of the terminal according to one embodiment of the invention. Alternatively, a part of the components (units) illustrated in FIG. 3 in the terminal 20 may be omitted.

An input unit 260 is used by a player to input operation data, and a function thereof can be realized by a touch panel, a touch panel-type display, or the like. Specifically, the input unit 260 has a detecting unit 262 capable of detecting a two-dimensional instruction position coordinates (x, y) on a screen on which an image is to be displayed. For example, the input unit 260 has the detecting unit 262 capable of detecting two-dimensional contact position coordinates (x, y) in a contact detection region (a touch panel).

It should be noted that a contact operation on a display screen (hereinafter, referred to as a "touch panel" except in special circumstances) 12 may be configured to be performed using a fingertip or performed using an input device such as a stylus.

In addition, the input unit 260 may include a button or a lever, a keyboard, a steering wheel, a microphone, an acceleration sensor, or the like which enables operation information (an operation signal) other than an instruction position to be input.

A storage unit 270 serves as a work area for the processing unit 200, a communicating unit 296, and the like, and a function of the storage unit 270 can be realized by a RAM (VRAM) or the like. In addition, the storage unit 270 includes a main storage unit 271 to be used as a work area, an image buffer 272 for storing a final display image and the like, user information 273 indicating information related to a user as a player with respect to a provided game, and a game data storage unit 274 for storing various kinds of data necessary for executing the game such as table data. Alternatively, a part of these components may be omitted, or the storage unit 140 of the server 10 may constitute a part of the components.

An information storage medium 280 (a computer-readable medium) stores a program, data, and the like, and a function of the information storage medium 280 can be realized by an optical disk (a CD or a DVD), a magneto-optical disk (MO), a magnetic disk, a hard disk, a magnetic tape, a memory (a ROM), or the like.

In addition, the information storage medium 280 can store a program that causes a computer to function as each unit (a program which causes a computer to execute processing of each unit) of the present embodiment. Moreover, as will be described later, the processing unit 200 performs various types of processing based on the program (data) stored in the information storage medium 280.

A display unit 290 is for outputting an image generated, and a function thereof can be realized by a CRT, an LCD, a touch panel-type display, a head-mounted display (HMD), or the like.

Using a touch panel display enables the display unit 290 to also function as the input unit 260 used by a player to perform game operations. In this case, as the touch panel, a touch panel adopting a resistive system (a four-wire system or a five-wire system), a capacitance system, an electromagnetic induction system, an ultrasonic surface acoustic wave system, an infrared scanning system, or the like can be used.

A sound output unit 292 is for outputting sound generated, and a function thereof can be realized by a speaker, a headphone, or the like.

A communicating unit 296 performs various control for communicating with the outside (for example, a host apparatus or another terminal), and a function of the communicating unit 296 can be realized by hardware such as various processors or a communication ASIC, a program, or the like.

It should be noted that the terminal 20 may receive a program or data which is stored in an information storage medium or the storage unit 270 included in the server 10 and which causes a computer to function as each unit of the present embodiment via the network, and store the received program or data in the information storage medium 280 or the storage unit 270. Cases where the terminal 20 functions by receiving a program and data in this manner can also be included in the scope of the invention.

The processing unit 200 (processor) performs, in conjunction with the server 10, processing such as game processing, image generating processing, and sound generating processing based on input data, a program, or the like from the input unit 260.

In particular, in the present embodiment, game processing includes processing for starting a game when game start conditions are fulfilled, processing for advancing the game, processing for arranging objects such as a player character and other player characters, processing for displaying the objects, processing for computing a game result, and processing for ending a game when game end conditions are fulfilled.

In addition, the processing unit 200 performs various kinds of processing using the storage unit 270 as a work area. Functions of the processing unit 200 can be realized by hardware such as various processors (a CPU, DSP, or the like) and an ASIC (a gate array or the like) or by programs.

In particular, the processing unit 200 includes an object space setting unit 210, a display control unit 212, an input acceptance processing unit 213, a game control unit 214, a game computing unit 215, a virtual camera control unit 216, a game managing unit 217, a drawing unit 220, and a sound processing unit 230. Alternatively, a part of these components may be omitted.

The object space setting unit 210 performs processing for arranging and setting various objects (objects constituted by primitive surfaces such as sprites, billboards, polygons, free-form surfaces, and subdivision surfaces) representing a displayed article such as an object (a player character, a mobile body, and other player characters), a movement path, a building, a tree, a column, a wall, or a map (landform) in an object space.

Specifically, the object space setting unit 210 determines a position and an angle of rotation (synonymous with orientation and direction) of an object (a model object), and arranges the object at the position (X, Y) or (X, Y, Z) at the angle of rotation (angles of rotation around the X and Y axes) or (angles of rotation around the X, Y, and Z axes).

In this case, an object space includes both a so-called virtual two-dimensional space and a virtual three-dimensional space. A two-dimensional space is a space in which, for example, an object is arranged at two-dimensional coordinates (X, Y), and a three-dimensional space is a space in which, for example, an object is arranged at three-dimensional coordinates (X, Y, Z).

In addition, when the object space is a two-dimensional space, a plurality of objects are arranged based on a priority set with respect to each of the objects. For example, processing can be performed involving sequentially arranging objects (sprites) starting with an object to be shown as if the object is located on an inward side and overlapping an object to be shown as if the object is located on a front side on top of the inward-side object.

Furthermore, by arranging an object with a large drawing size in a lower part of an image and arranging an object with a small drawing size in an upper part of the image, an object space corresponding to the upper part of the image can be shown as though located on an inward side and an object space corresponding to the lower part of the image can be shown as though located on a front side.

Moreover, when the object space is a three-dimensional space, objects are arranged in a world coordinate system.

The display control unit 212 causes the display unit 290 to display information necessary for preventing a recurrence of an immovable state in the game field based on information transmitted from the server 10.

The input acceptance processing unit 213 accepts an input instruction of a player having been input using the input unit 260 and outputs the accepted input instruction to the game control unit 214, the server 10, or both.

The game control unit 214 executes, in conjunction with the server 10, game processing based on a command accepted by the input acceptance processing unit 213.

In particular, the game control unit 214 executes control with respect to a character to be an operation object (in other words, a player character), a player character of another player, or another ancillary character based on various kinds of information about the game (game information, information related to a movement of a player character (including information related to a movement determination), information related to a state of movement, information related to a remedial processing for remedying an immovable state, or information related to preventing a recurrence of an immovable state upon occurrence thereof) transmitted from the server 10, and a command (in other words, an input instruction) accepted by the input acceptance processing unit 213.

For example, the game control unit 214 executes a predetermined operation such as supporting attack on an enemy character or supporting capability recovery of an ally character in the case of a match-up game including an action game or a shooting game and growing crops or constructing a building in the case of a simulation game.

Meanwhile, the game control unit 214 performs a movement calculation of a character object that is an operation object such as a mobile body object (in particular, a character object such as a player character or other player characters) in an object space.

In other words, in conjunction with the server 10, the game control unit 214 performs processing of moving a mobile body object in an object space or controlling an action (motion or animation) of the mobile body object based on game information transmitted from the server 10 and input data input by a player using the input unit 260 or a program (a movement algorithm), various data (motion data), or the like.

Specifically, the game control unit 214 performs simulation processing of sequentially obtaining, for every frame, movement information (a direction of movement, an amount of movement, a speed of movement, a position, an angle of rotation, or an acceleration) and action information (a position or an angle of rotation of each part object) of an object. In this case, a frame refers to a unit of time when performing movement processing or action processing (simulation processing) of an object and image generation processing. In addition, in the present embodiment, a frame rate may be fixed or may be variable in accordance with processing load.

Moreover, the game control unit 214 executes processing of moving an object based on an input direction in a three-dimensional object space. For example, the game control unit 214 associates a direction of movement with each input direction in advance and moves the object in the direction of movement corresponding to the input direction.

In addition, the game control unit 214 may execute processes in conjunction with the server 10, and a part of or all of the game control unit 214 may be formed in the server 10.

The game computing unit 215 performs a variety of processing for game computation. In particular, the game computing unit 215 performs computing processes necessary for executing a shooting game such as formation of an object space determined in advance of the game, formation of an object space based on a map, progress of the game based on a scenario set in advance in accordance with an operation by the user, a match-up with a player character, other player characters, or other objects, and management of parameters during the match-up.

Moreover, while the game computing unit 215 executes the processes in conjunction with the server 10, a part of or all of the game computing unit 215 may be formed in the server 10.

The virtual camera control unit 216 generates an image that appears to have depth of a game space visible from a given perspective. In this case, the virtual camera control unit 216 performs control processing of a virtual camera (a perspective) for generating an image that is visible from a given (an arbitrary) perspective in the object space. Specifically, the virtual camera control unit 216 performs processing of controlling a position (X, Y, Z) or an angle of rotation (angles of rotation around the X, Y, and Z axes) of the virtual camera (processing of controlling a perspective position or a perspective direction).

For example, when photographing an object (for example, a character, a ball, or a vehicle) from behind with a virtual camera, the position or the angle of rotation of the virtual camera (an orientation of the virtual camera) is controlled so that the virtual camera tracks a change in the position or a change in the rotation of the object.

In this case, the virtual camera can be controlled based on the position, the angle of rotation, the speed, or the like of the object obtained by the game control unit 214. Alternatively, control may be performed for causing the virtual camera to rotate in an angle of rotation determined in advance or causing the virtual camera to move along a movement path determined in advance. In addition, in this case, the virtual camera is controlled based on virtual camera data for specifying a position (a movement path) or an angle of rotation of the virtual camera.

Moreover, the virtual camera may be set as a perspective of a player character. Furthermore, when a plurality of virtual cameras (perspectives) are present, the control processing described above is performed with respect to each virtual camera.

In conjunction with the server 10, the game managing unit 217 sets a player character and various items to be used by each player in a game such as a match-up game or the like based on an operation by the player input via the input unit 260, and registers the player character and the various items in the user information 273.

The drawing unit 220 performs image drawing processing based on various pieces of information related to image generation transmitted from the server 10 and results of a variety of processing (game processing) performed by the processing unit 200 and, accordingly, generates an image and outputs the generated image to the display unit (display) 290.

In particular, the image generated by the drawing unit 220 may be a so-called two-dimensional image or a so-called three-dimensional image. In particular, the drawing unit 220 generates an image which is visible from a virtual camera in an object space and which is to be displayed on a screen.

When generating a two-dimensional image, the drawing unit 220 sequentially draws objects in an ascending order of set priorities, and when objects overlap with each other, the drawing unit 220 draws the object with the higher priority on top.

In addition, when generating a three-dimensional image, the drawing unit 220 first receives input of object data (model data) including vertex data (positional coordinates, texture coordinates, color data, a normal vector, an a value, or the like of a vertex) of each vertex of an object (a model), and based on vertex data included in the input object data, performs vertex processing. When performing vertex processing, vertex generation processing (tesselation, curved surface division, or polygon division) for redividing a polygon may be performed if necessary.

In addition, in vertex processing, movement processing, coordinate transformation (world coordinate transformation or camera coordinate transformation), clipping processing, perspective transformation, or geometry processing such as light source processing of a vertex is performed, and based on a processing result thereof, vertex data provided with respect to a group of vertices that constitute an object is changed (updated or adjusted). Furthermore, rasterization (scan conversion) is performed based on the vertex data after the vertex processing, and a surface of a polygon (a primitive) is associated with pixels. Following the rasterization, pixel processing (fragment processing) for drawing pixels constituting an image (fragments constituting a display screen) is performed.

In pixel processing, various processing including texture reading (texture mapping), setting/changing of color data, translucent compositing, and anti-aliasing is performed to determine a final drawing color of pixels constituting an image, and drawing colors of an object subjected to translucent composition is output (drawn) to the image buffer 272 (a frame buffer: a buffer capable of storing image information in pixel units; a VRAM or a rendering target). In other words, in pixel processing, per-pixel processing is performed in which image information (a color, a normal, brightness, an a value, or the like) is set or changed in pixel units.

Accordingly, an image viewed from a virtual camera (a given perspective) set in an object space is generated. When a virtual camera (a perspective) exists in plurality, an image can be generated so that images viewed from the respective virtual cameras are displayed on one screen as divided images.

It should be noted that the vertex processing and the pixel processing performed by the drawing unit 220 may be realized in accordance with a shader program described in a shading language by a so-called programmable shader (a vertex shader or a pixel shader) that is hardware which makes drawing processing of a polygon (a primitive) programmable. With a programmable shader, making processing in vertex units and processing in pixel units programmable increases a degree of freedom of contents of drawing processing and significantly improves expressiveness as compared to static drawing processing by hardware.

A lock-on processing unit (not shown) executes lock-on processing in which an object satisfying a lock-on condition such as a condition where an object at a close distance from a player character is preferentially selected or a condition where an object close to a central axis when crosshairs are trained is determined (locked-on) as a selection object is preferentially selected from a plurality of objects that appear in a game space.

In addition, when drawing an object, the drawing unit 220 performs geometry processing, texture mapping, hidden surface removal processing, a blending, and the like.

In geometry processing, processing such as coordinate transformation, clipping processing, perspective projection transformation, or a light source calculation is performed with respect to the object. In addition, object data (a positional coordinate, a texture coordinate, color data (brightness data), a normal vector, an a value, or the like of vertices of an object) after the geometry processing (after the perspective projection transformation) is stored in the storage unit 270.

In texture mapping, processing of mapping a texture (a texel value) stored in a texture storage unit of the storage unit 270 to an object is performed. Specifically, using a texture coordinate or the like set (added) to a vertex of an object, a texture (surface properties such as a color (RGB) and an a value) is read from the texture storage unit of the storage unit 270 and the texture that is a two-dimensional image is mapped to an object. In this case, processing for associating pixels and texels with each other and bilinear interpolation or the like as interpolation of texels are performed.

It should be noted that, in the present embodiment, processing of mapping a given texture may be performed when drawing an object. In this case, a color distribution (a texel pattern) of the texture to be mapped can be dynamically changed.

In addition, in this case, a texture with a different color distribution (a pixel pattern) can be dynamically generated, or a plurality of textures with different color distributions may be prepared in advance and a texture to be used may be dynamically switched to another texture. Furthermore, the color distribution of a texture may be changed in object units.

In the hidden surface removal processing, hidden surface removal processing according to Z-buffering (a depth comparison method, a Z test) using a Z-buffer (a depth buffer) is performed in which a Z-value (depth information) of a drawing pixel is stored. Specifically, when drawing a drawing pixel corresponding to a primitive of an object, the Z-value stored in the Z-buffer is referenced and the referenced Z-value of the Z-buffer and a Z-value in the drawing pixel of the primitive are compared with each other, and when the Z-value in the drawing pixel is a Z-value to the front as viewed from the virtual camera (for example, a smaller Z-value), drawing processing of the drawing pixel is performed and, at the same time, the Z-value of the Z-buffer is updated to a new Z-value.

In a blending (a compositing), the drawing unit 220 performs translucent compositing processing (straight α blending, additive α blending, or subtractive α blending) based on an α value (an A value). It should be noted that the α value is information that can be stored in association with each pixel (texel, dot) and is, for example, additional information other than color information. The α value can be used as mask information, translucency (equivalent to transparency and opacity), bump information, and the like.

In addition, the drawing unit 220 may generate an image to be displayed in a display region corresponding to a contact detection region. The image to be displayed in the display region may be, for example, an image including an object.

The sound processing unit 230 performs sound processing based on results of a variety of processing performed by the processing unit 200, generates game sounds including a BGM, a sound effect, and voices, and outputs the game sounds to the sound output unit 292.

4. Method 4.1. Overview

Next, an overview of a method (matching match-up control processing) according to one embodiment of the invention will be described with reference to FIGS. 4A to 4D. FIGS. 4A to 4D are diagrams for explaining an overview of matching match-up control processing according to one embodiment of the invention.

For example, in conjunction with the terminal 20 operated by each player, the server 10 is configured to form a single game space (in other words, a game field constituted by a virtual three-dimensional space) and execute a match-up game such as a battle game, an action game, an RPG, a sound game, or a sport game involving a plurality of player characters respectively operated and controlled by each player in the game field.

In addition, the server 10 is configured to execute a game involving the movement of the plurality of player characters in the game field formed in the game space and provide the terminal 20 with information related to the game.

Furthermore, the server 10 is configured to match a plurality of player characters or groups of the player characters with each other during a match-up game and control a game of a matching match-up (hereinafter, referred to as a "matching match-up game") involving battle or hand-to-hand combat in the form of an inter-individual match-up or an inter-group (team) match-up.

In particular, the server 10 is configured in a matching match-up game to:

(A1) determine a player to be a match-up opponent as a matched player and realize a match-up game which executes various game control such as battle or hand-to-hand combat using the matched player and a player character (in other words, a matched player character); or (A2) determine a player character to be a match-up opponent and realize a match-up game which executes various game control such as battle or hand-to-hand combat using the determined matched player character.

In addition, the server 10 is configured to execute, during a matching match-up game, a match-up game between matched players or matched player characters free from interference by a player character who is operated by a player (hereinafter, referred to as an "unmatched player") other than a matched player or a player character (hereinafter, referred to as an "unmatched player character") other than a matched player character.

For example, when an element of an individual match-up or an inter-team match-up is incorporated into a match-up game which is executed by a plurality of players and which proceeds in a same game space, during execution of a matching match-up, interference (specifically, an attack) by an unmatched player character who is not participating in the matching match-up is highly likely to occur.

In particular, in a battle royale match-up game that mainly involves engaging in battles, it is important to launch an attack on another player character while hiding from the other player character, and when a battle is being engaged by a plurality of player characters, the likelihood of becoming a target of attack from another player character who is not participating in the battle increases.

Therefore, in such a case, when interference (an attack) by an unmatched player character to a matched player character performing an inter-individual match-up is expected, each player who is engaged in an inter-individual match-up is not only no longer able to concentrate on the inter-individual match-up but the likelihood of losing the inter-individual match-up increases when actually attacked by the unmatched player character.

For this reason, in such a case, proactively initiating an inter-individual match-up or a group match-up is not an effective method in terms of game strategy when considering a match-up game as a whole.

In particular, in the match-up game, game specifications are often adopted in which many benefits are offered depending on a contribution ratio to the battle, benefits are offered to a player who had launched a final attack (a decisive attack leading to defeat), or a winning player (in other words, a winning player character) is allowed to collect an item previously owned by a losing character (for example, an item dropped due to defeat in the game).

Therefore, under such a condition, an unmatched player (in other words, an unmatched player character) who has attacked a player character engaged in an inter-individual match-up may end up with the fruit of battle that can be gained by winning the inter-individual match-up or a group match-up as though a third dog running away with a bone fought over by two other dogs.

In consideration thereof, the server 10 is configured so as to be capable of controlling match-ups between matched players or matched player characters free of interference by a player character of an unmatched player or an unmatched player character who had not been matched when executing an inter-individual match-up or a group match-up, and increasing a frequency of match-ups between players or player characters during a match-up game and invigorating the game and, consequently, improving an entertainment level of the game while eliminating interference by an unmatched player character during a matched match-up.

Specifically, the server 10 is configured to:

(A1) control an energy parameter value stored in the player information storage unit 146 in accordance with interference from a player character of another player during execution of a match-up game for each player character of each player;

(A2) execute matching processing of matching at least two or more players or player groups from a plurality of players or a plurality of player groups respectively constituted by a plurality of players and determine the players or the player groups who have been matched as matched players at a given timing during the execution of the match-up game; and (A3) execute, as matched match-up control processing, control processing related to a matching match-up using player characters as matched player characters between matched players determined by the matching processing.

In addition, during execution of the matching match-up control processing, the server 10 is configured to:

(B1) execute, when interference from a matched player character to another matched player character occurs, parameter control processing with respect to the matched player character having been subjected to the interference in accordance with the interference; and (B2) execute parameter control disabling processing of disabling control of a parameter value in accordance with interference by a player character of an unmatched player who differs from a matched player to the matched player character.

Figure 4A:
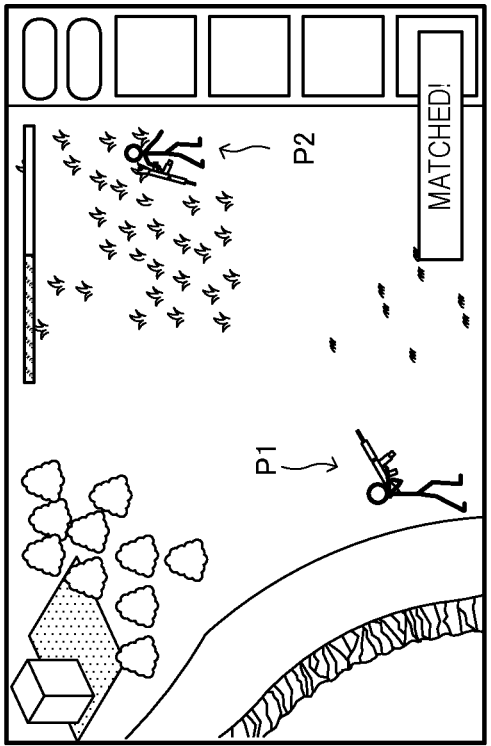
FIGS. 4A to 4D are, respectively, diagrams for explaining an overview of matching match-up control processing according to the embodiment of the invention.
Figure 4B:
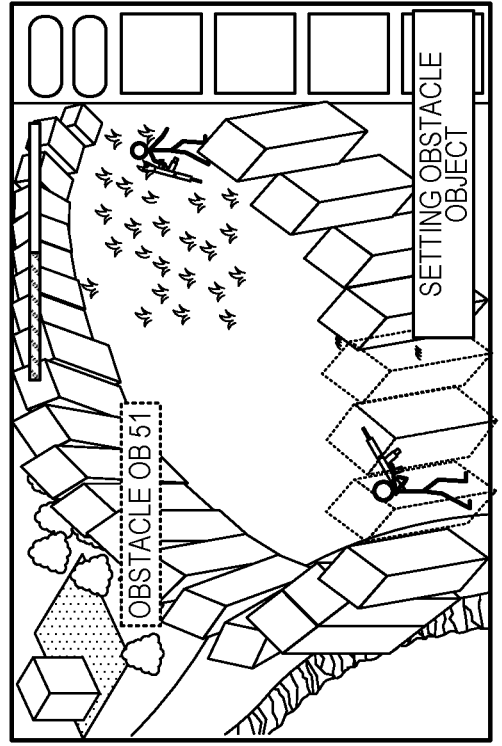

For example, as illustrated in FIG. 4A, during a match-up game, the server 10 executes matching processing of matching a specific player character P1 with another player character P2 at a timing where the specific player character P1 discovers the other player character P2 and points a gun at the other player character P2 in order to launch an attack (refer to FIG. 4B).

In addition, when the specific player character P1 and the other player character P2 are matched, the server 10 sets a dedicated area (hereinafter, also referred to as a "matching match-up dedicated area") 50 for executing a matching match-up in a game space while eliminating interference from other player characters (refer to FIG. 4C), and arranges an obstacle object 51 at a boundary portion between the dedicated area 50 and another area (refer to FIG. 4D).

Furthermore, the server 10 causes a matching match-up between the player characters P1 and P2 to be executed in the dedicated area 50 where the obstacle object 51 is arranged.

It should be noted that, in the present embodiment, other matched player characters or other unmatched player characters may be characters that are operated by players or NPCs (non-player characters) which are controlled in accordance with game processing such as a program or the like and which are not controlled by players.

In addition, in the present embodiment, a game space in which a main game and a matching match-up game are to be executed may be a three-dimensional space or a two-dimensional space and need only be a space in which a game field is formed.

Furthermore, in the present embodiment, while "interference" will be described using an attack in battle or hand-to-hand combat (including a physical attack using a weapon as well as a supernatural attack using magic or the like), in addition thereto, "interference" may be an action that influences another player or player character such as interfering with another player or player character in a game that involves a player matching up with another.

4.2. Parameter Control Processing

Next, parameter control processing according to one embodiment of the invention will be described.

The parameter control unit 107 controls, during a match-up game including a matching match-up, an energy parameter value stored in the player information storage unit 146 in accordance with interference such as an attack from a player character of another player.

In particular, the parameter control unit 107 executes, when sustaining an attack as interference from another player character, processing of reducing a parameter value of life energy (hereinafter, also referred to as a "life energy value") of a player character having been subjected to the interference based on an offensive capability (specifically, a hit point) indicating a parameter value of the attack.

For example, when sustaining an attack from another player character, the parameter control unit 107 subtracts a hit point of the player character having executed the attack from a value of life energy prior to sustaining the attack of the player character having sustained the attack.

Alternatively, the parameter control unit 107 may execute the parameter control processing based on a parameter value that defines a defensive capability of the player character having sustained the attack.

In this case, for example, a parameter value defining a defensive capability of the player character sustaining the attack may be subtracted from a parameter value indicating an offensive capability of the player character executing the attack, and a value calculated by the subtraction may be used as a life energy value of the player character sustaining the attack.

Furthermore, as points that define an offensive capability (hit point) or a defensive capability, in addition to parameter values of the offensive capability or the defensive capability defined with respect to a player character, the parameter control unit 107 may calculate a parameter of the offensive capability or the defensive capability based on: a parameter value defined with respect to an item in possession or an item used when carrying out an attack or defense; a player character defined with respect to a combo when executing the combo; an operation timing (for example, attack with 100% capability when an instruction to launch the attack is issued at a timing that matches a timing determined in advance) or an operation type (for example, attack with 200% capability when a predetermined button is hit five times in quick succession from a predetermined timing); or a combination of two or more of these elements.

It should be noted that, as interference, the parameter control unit 107 may use recovery processing from another player character besides an attack and, in this case, the parameter control unit 107 may execute, based on the recovery processing, processing of increasing a parameter value such as life energy of the player character having been subjected to the recovery processing.

In addition, when interference such as an attack or execution of recovery processing is being performed on another player character, the parameter control unit 107 may execute processing of increasing a life energy value of the player character having launched the attack or execute, in response to the recovery processing from the other player character, processing of reducing a parameter value such as life energy of the player character who had provided the recovery processing.

Furthermore, while an energy parameter value is used when executing the parameter control processing, a level or an attribute of a player (including a team to which a plurality of players belong) or a player character, earned experience points (including lives and points), in-game currency, and a value of a parameter that defines capabilities or characteristics of a player character may be used.

In addition to the above, while the parameter value used in the present embodiment is preferably a value of a parameter that defines a winner or a loser of a game, the parameter value is not limited thereto.

4.3. Matching Processing

Next, matching processing according to one embodiment of the invention will be described.

4.3.1. Overview of Matching Processing

The matching processing unit 105 according to one embodiment of the invention executes matching processing of matching at least two or more players or player groups from a plurality of players or a plurality of player groups respectively constituted by a plurality of players and determining the players having been matched as matched players at a given timing during the execution of a match-up game.

Specifically, the matching processing unit 105 executes matching processing of matching at least two or more players from a plurality of players in the case of an inter-individual match-up and matching at least two or more player groups from a plurality of player groups respectively constituted by two or more players in the case of an inter-group match-up, and determining the players having been matched as matched players.

It should be noted that the matching processing unit 105 need only match at least two or more players in the matching processing unit and may match two players or three players or match two or more teams respectively constituted by a plurality of players.

In addition, the matching processing unit 105 may directly execute the matching processing with respect to a player character. However, hereinafter, matching processing that matches players with each other will be described unless otherwise noted.

4.3.2. Given Timing

As the given timing, the matching processing unit 105 executes the matching processing at:

(A1) a timing at which an instruction from a predetermined player is executed such as a timing at which a request for a matching match-up is accepted from the player;

(A2) a timing at which an instruction created on a game program (in other words, an instruction from a computer) in accordance with game progress such as a timing of entering a predetermined area such as a building arranged in a game space;

(A3) a timing at which a given event occurs such as a timing of a food drop or a timing at which an explosion occurs in an existing area; and (A4) a timing at which a given condition is satisfied.

In particular, "a timing at which a given condition is satisfied" includes a timing at which another player initiates an attack, a timing at which a predetermined item (a machine gun) is acquired or used, and a timing at which a value of a parameter determined in advance such as points or experience points satisfies a condition determined in advance.

4.3.3. Matching Processing

The matching processing unit 105 reads, from the player information storage unit 146, at the timings described above, various pieces of information related to each player and a player character of each player such as a game level value of the player and the player character, items which are worn by the player and the player character, an area or a position where the player and the player character are present in the game space.

In addition, the matching processing unit 105 determines a combination of players to perform a matching match-up game in accordance with:

(B1) an attack action or an attack start action; or (B2) a type or a level of a player character based on read information such as a game level value or a position, a parameter value of an offensive capability, a defensive capability, or an attribute, equipment of player characters, or a previous match-up history of the players.

Specifically, the matching processing unit 105 executes matching processing for matching with:

(C1) a player who operates a player character who is a target of an attack (including not only a case where an attack is initiated such as when firing a firearm but also an action for initiating an attack including pointing the firearm at the target and training crosshairs (a reticle) on the target or locking onto the target);

(C2) another player who operates a player character present in a periphery of or a same area (a same building or a defined area) as a player character of an own player in a game space;

(C3) another player of which a predetermined parameter such as a game level or an experience point is the same as the own player or another player in a range where the parameter is considered the same;

(C4) another player having sustained an attack (interference) or currently sustaining an attack (interference) from the own player; or (C5) another player possessing a player character who uses a same item as a player character of the own player.

It should be noted that a "range where the parameter is considered the same" includes, for example, a game level (for example, ±1) which belongs to a certain numerical value range expected to have a same ability when engaging in a match-up or an experience point (for example, ±100) which belongs to a certain numerical value range expected to have a same experience.

In addition, the matching processing unit 105 may randomly execute matching or may match another player designated by a player.

4.4. Matching Match-Up Control Processing Including Parameter Control Disabling Processing Next, matching match-up control processing including parameter control disabling processing according to one embodiment of the invention will be described with reference to FIGS. 5A to 7.

Figure 5B:
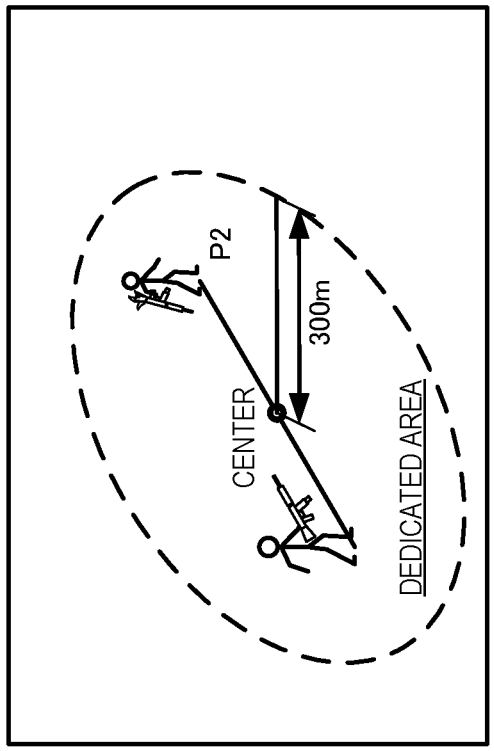
FIGS. 5A to 5C are, respectively, diagrams for explaining parameter control disabling processing (interference inhibiting processing 1) according to the embodiment of the invention.
Figure 5A:
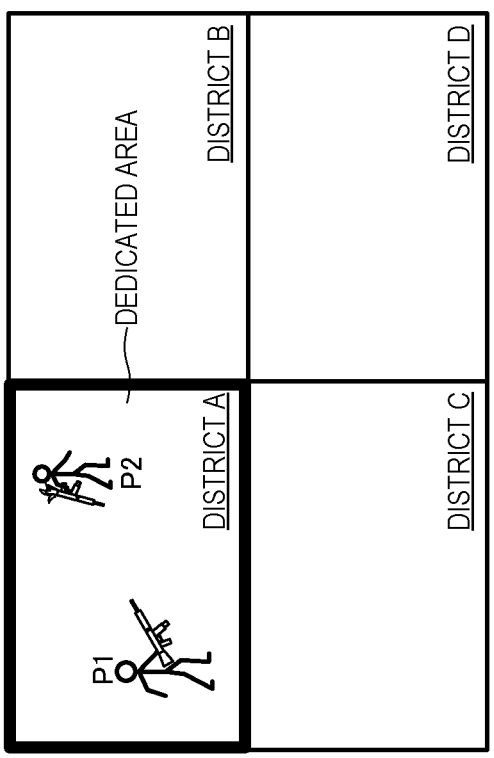
Figure 5C:
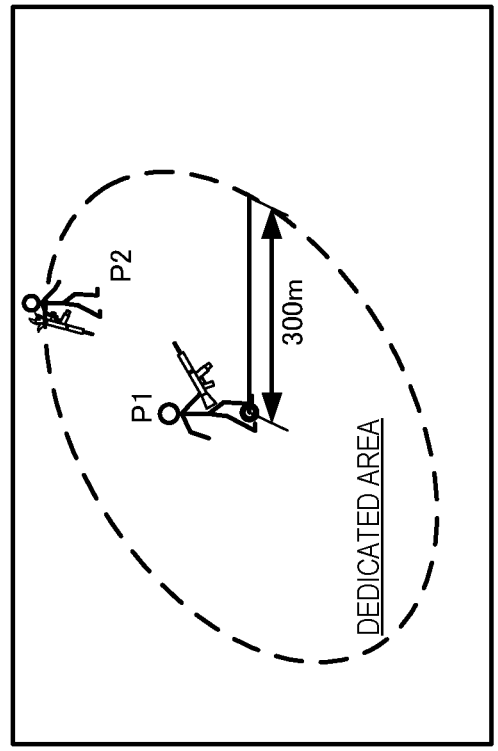
Figure 6:
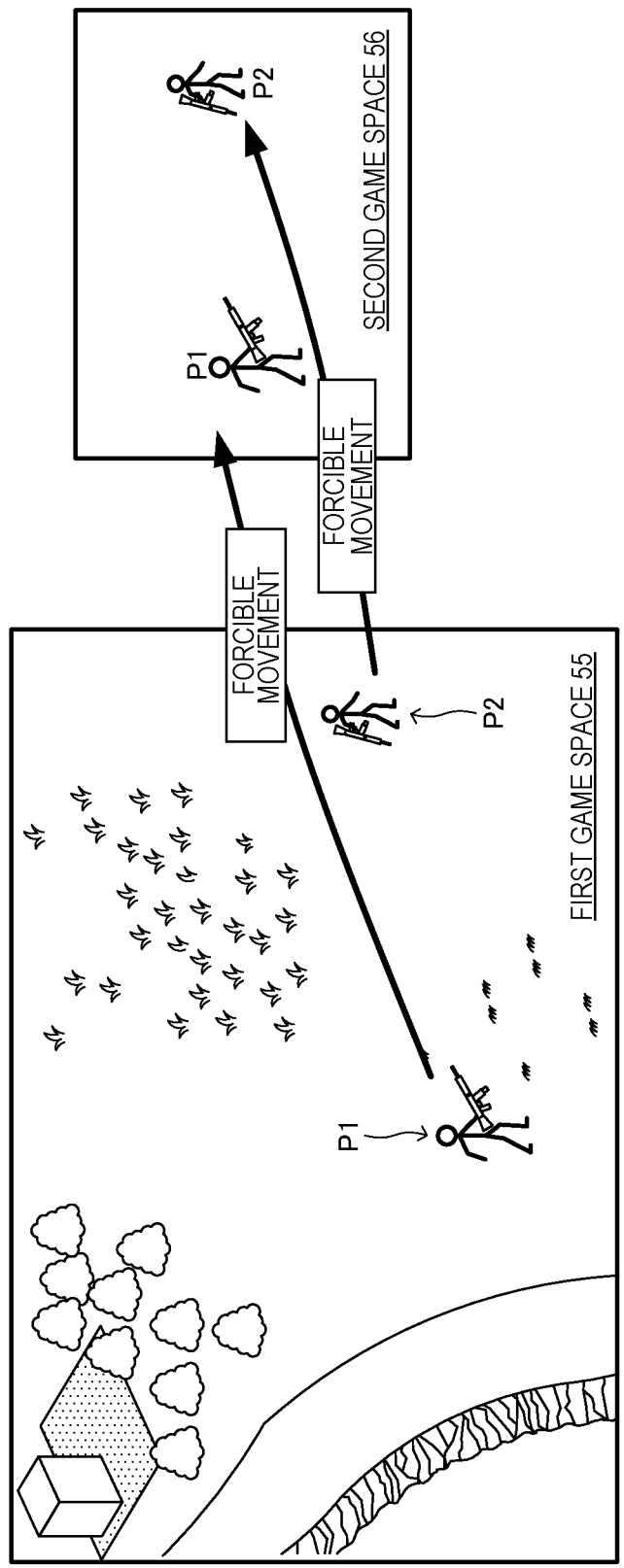
FIG. 6 is a diagram for explaining parameter control disabling processing (interference inhibiting processing 2) according to the embodiment of the invention.
Figure 7:
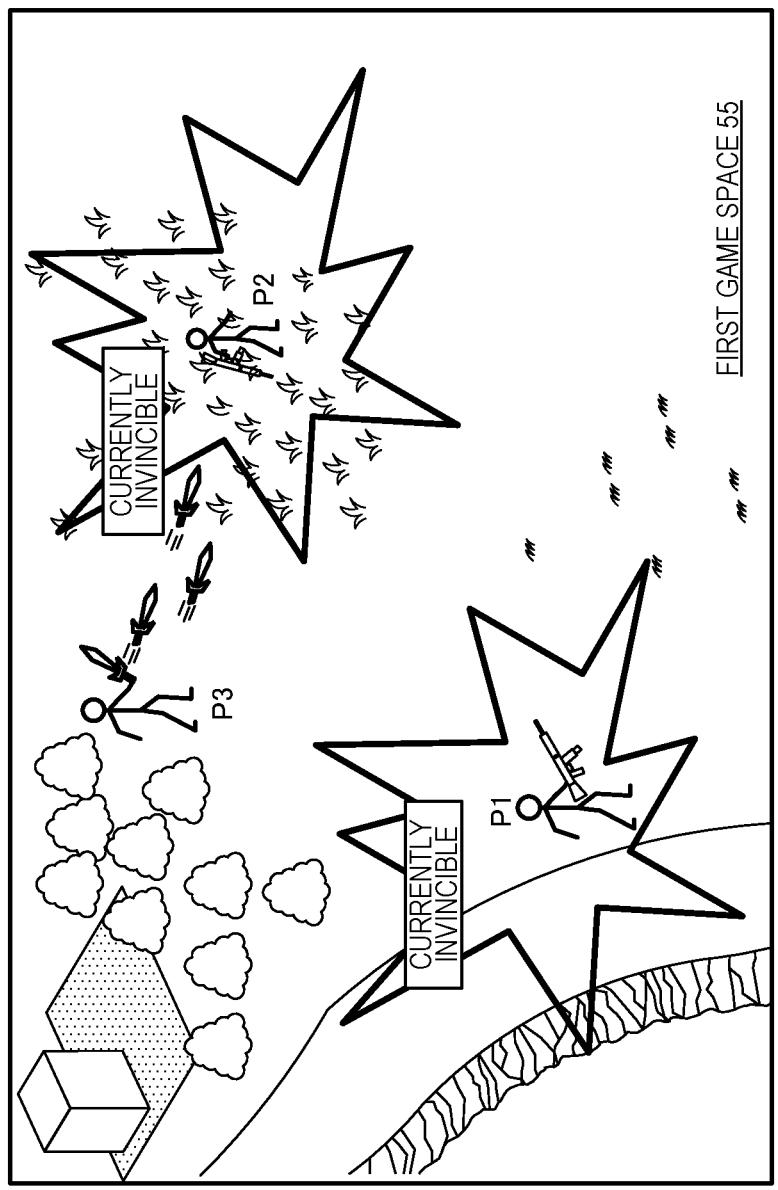
FIG. 7 is a diagram for explaining parameter control disabling processing (interference disabling processing) according to the embodiment of the invention.

FIGS. 5A to 5C are diagrams for explaining parameter control disabling processing (interference inhibiting processing 1) and FIG. 6 is a diagram for explaining parameter control disabling processing (interference inhibiting processing 2). In addition, FIG. 7 is a diagram for explaining parameter control disabling processing (interference disabling processing).

4.4.1. Principle of Matching Match-Up Control Processing

In conjunction with the game managing unit 103, the matching match-up managing unit 106 executes, as matched match-up control processing, control processing related to a match-up using player characters as matched player characters in an individual match-up or a group match-up determined by the matching processing.

Specifically, the matching match-up managing unit 106 acquires operation information input by a player from the terminal 20, and executes matching match-up control processing related to a match-up game from the start of the match-up to the end of the match-up based on the acquired operation information and information on each player and a player character of each player.

In addition, the matching match-up managing unit 106 executes parameter control disabling processing of disabling control of a parameter value in accordance with interference by a player character of an unmatched player who differs from a matched player (including a matched player character not matched with the matched player by the matching processing (a matched player having been matched with another matched player)) to the matched player character during execution of the matching match-up control processing.

Furthermore, in conjunction with the parameter control unit 107, the matching match-up managing unit 106 executes the parameter control processing only with respect to an attack between matched player characters during a matching match-up.

Details of the matching match-up control processing that is executed by the matching match-up managing unit 106 will be provided later.

In addition, when a given matching match-up end condition is satisfied during execution of the matching match-up control processing, the matching match-up managing unit 106 ends the matching match-up control processing including the parameter control disabling processing to be described later.

For example, the matching match-up managing unit 106 ends the matching match-up control processing and the parameter control disabling processing in the following cases where the matching match-up end condition is satisfied:

(A1) when an outcome of a matching match-up is decided (when any matched player character wins (including a case where the other matched player character becomes incapacitated));

(A2) in a case of a match-up between groups respectively formed by a plurality of matched player characters, when any of the groups wins (including a case where all of or a part of the matched player characters belonging to any of the groups become incapacitated);

(A3) when a matching match-up can no longer be advanced (such as when both matched player characters become incapacitated due to attacks simultaneously sustained by both matched player characters or the like);

(A4) when a predetermined period of time elapses from start of the matching match-up control processing; or (A5) when a predetermined event is executed (such as when a matched player character flees).

4.4.2. Parameter Control Disabling Processing

As described above, as the parameter control disabling processing, the matching match-up managing unit 106 executes:

(B1) interference inhibiting processing of preventing an occurrence of interference itself from an unmatched player character (in other words, a player character of a third-person player who is outside of control due to matching match-up control processing) to a matched player character; or (B2) interference disabling processing of disabling the interference even when the interference occurs such that a parameter value does not fluctuate.

In particular, as the interference inhibiting processing, the matching match-up managing unit 106 generates a matching match-up region in which a matched player character is present and from which an unmatched player character has been excluded in a game space, and disables movement control processing of controlling a movement of an object from a non-matching match-up region that differs from the matching match-up region to the matching match-up region in the game space and influence control processing of controlling exercise of influence.

Specifically, as the interference inhibiting processing, the matching match-up managing unit 106 sets a matching match-up region and other regions of a game section in which match-up games are executed so as to be spatially continuous, and arranges, in a periphery thereof (in other words, on a boundary thereof), an obstacle object which inhibits entry of other objects including entry of an unmatched player character and which inhibits exercise of influence involving a direct attack on a matched player by an unmatched player using magic, supernatural powers, or the like.

For example, the matching match-up managing unit 106:

(C1) sets, among a plurality of areas (for example, district A, district B, district C, and district D) created by dividing a game space in plurality in advance, an area (for example, district A) where matched player characters P1 and P2 are present at that time point as a matching match-up dedicated area (dedicated area) (FIG. 5A); and (C2) obtains a center of positions of the matched player characters P1 and P2 and sets a predetermined range from the center (for example, within a range 300 m in circumference around a center position between the matched player characters) (FIG. 5B), or (C3) sets, as the matching match-up dedicated area, an area of a game space in which any matched player is present or a predetermined range (for example, 300 m) around a position of the matched player (FIG. 5C).

Figure 4C:
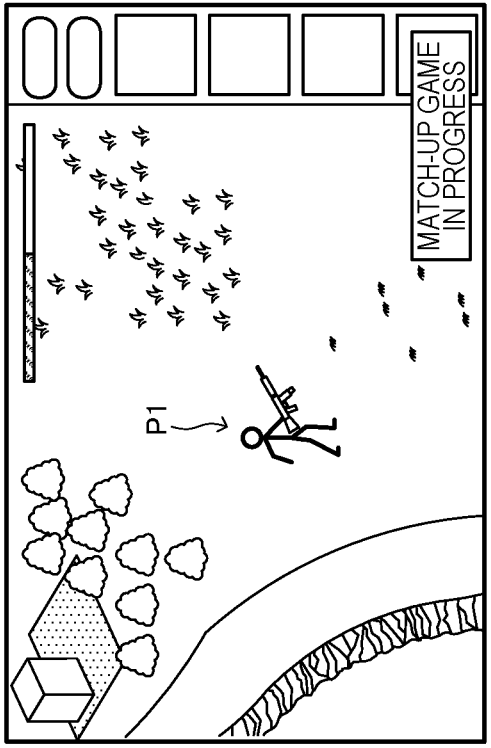
Figure 4D:
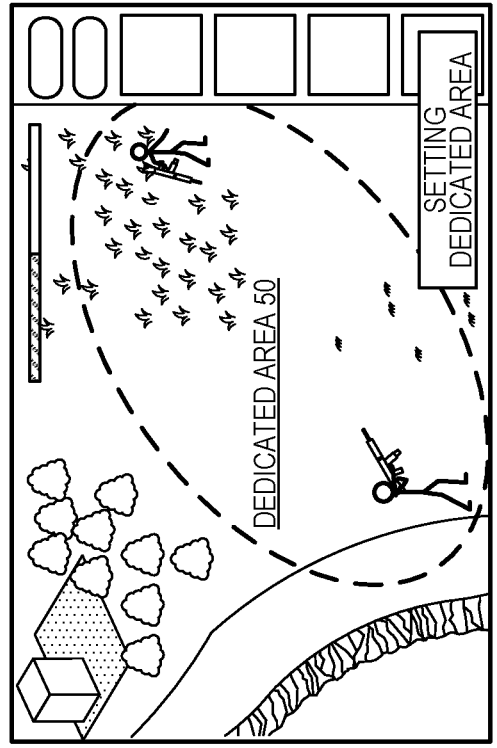

In addition, as illustrated in FIGS. 4C and 4D, on a boundary between the set matching match-up dedicated area and an area of another game space, the matching match-up managing unit 106 sets an obstacle object which has an effect of inhibiting movement of objects capable of moving to the game space such as a bullet and an automobile in addition to player characters and which has an effect of inhibiting exercise of influence such as an attack from a non-matching match-up region to a matching match-up region based on a capability set to a player character such as magic or a supernatural power.

It should be noted that exercise of influence indicates, for example, an action for imparting given influence from a non-matching match-up region to a matching match-up region using a capability set to a player character such as magic or a supernatural power without moving any object from the non-matching match-up region to the matching match-up region.

In addition, when there is a matched player character who is not present in the matching match-up dedicated area, the matching match-up managing unit 106 arranges the matched player character in the matching match-up dedicated area.

Alternatively, as the interference inhibiting processing, for example, as illustrated in FIG. 6, the matching match-up managing unit 106 may execute processing of rearranging (in other words, forcibly moving) a matched player character to a game space (hereinafter, referred to as a "second game space") which differs from a game space (hereinafter, referred to as a "first game space") in which a plurality of player characters are engaged in a match-up and executing a matching match-up in the second game space.

FIG. 6 is a diagram illustrating that the matched player character P1 and the matched player character P2 have been rearranged (forcibly moved) to a separate second game space 56 which differs from a first game space 55 where a match-up game is being executed.

On the other hand, as the interference disabling processing, for example, as illustrated in FIG. 7, the matching match-up managing unit 106 executes processing of making a matched player character invincible from an unmatched player character and enabling interference (an attack or an obstruction) from the unmatched player character to the matched player character in accordance with a hit determination or the like but prevents a parameter value from fluctuating in cases other than interference from the matched player character.

FIG. 7 is a diagram illustrating that the matched player character P1 and the matched player character P2 have been made invincible from attacks by an unmatched player character P3 in the game space 55 where a match-up game is being executed.

In addition, in this case, in conjunction with the matching match-up managing unit 106, the game managing unit 103 may execute processing with respect to an attack from a matched player to an unmatched player of causing a parameter value of an unmatched player character to fluctuate based on the attack in a similar manner to the processing applied to inter-individual match-ups other than matching match-ups, or execute processing of preventing the parameter value from fluctuating based on the attack as the interference disabling processing.

4.4.3. Processing after Matching Match-Up 1: Invincibility-Imparting Processing

The matching match-up managing unit 106 executes invincibility-imparting processing of making each matched player character invincible for a certain period of time after the end of a matching match-up in a similar manner to the interference disabling processing in order to block interference such as an attack from an unmatched player character.

In other words, when a matching match-up is being executed in a same game space, the matching match-up managing unit 106 executes the invincibility-imparting processing of blocking interference such as an attack from an unmatched player character for a certain period of time after the end of the matching match-up, and when a matching match-up is being executed in another game space, the matching match-up managing unit 106 executes the invincibility-imparting processing after rearrangement to a game space where a match-up game is being executed.

For example, as the invincibility-imparting processing, the matching match-up managing unit 106 makes a player character having previously been a matched player character invincible for a predetermined period of time (for example, 10 seconds).

4.4.4. Processing after Matching Match-Up 2: Rearrangement Processing

When the matching match-up control processing ends, the matching match-up managing unit 106 may execute, in place of the invincibility-imparting processing, a rearrangement processing of rearranging a matched player character at a position that differs from a position in the game space where a matching match-up based on the matching match-up control processing had been executed.

In particular, a position in the game space where a matching match-up had been executed includes a position in a game space that differs from a game space where a match-up game is to be performed as well as a position in a game space that is the same as the game space where a match-up game is to be performed.

In other words, when a matching match-up is being executed in a same game space, the matching match-up managing unit 106 executes the rearrangement processing of rearranging a matched player character from the position to another position, and when a matching match-up is being executed in another game space, the matching match-up managing unit 106 executes the rearrangement processing of the matched player character from a position where the matched player character had been present prior to performing the match-up game to another position.

It should be noted that the matching match-up managing unit 106 may:

(D1) determine whether or not an unmatched player character is present in a periphery (for example, within a range with a 1 km-radius) of a position (hereinafter, referred to as a "reference position") of a matching match-up when the matching match-up is being executed in a same game space or in a periphery (for example, within a range with a 1 km-radius) of a position (in other words, the "reference position") where the unmatched player character had been present prior to performing a matching match-up when the matching match-up is being executed in another game space; and (D2) execute the rearrangement processing when the unmatched player is present in the periphery of the reference position.

In addition, in this case, when a matching match-up is being executed in another game space and an unmatched player is not present in the periphery of the reference position, the matching match-up managing unit 106 rearranges the matched player character to the reference position.

Furthermore, in the present embodiment, the rearrangement processing may be applied both when the interference inhibiting processing is performed and when the interference disabling processing is performed.

4.4.5. Processing after Matching Match-Up 3: Awarding Benefits

After the end of a matching match-up, the matching match-up managing unit 106 executes processing of awarding a specific item or points (including experience points and in-game currency) to a winning matched player or a winning matched player character.

For example, the matching match-up managing unit 106 offers a winning matched player a specific coin for advantageously advancing the game which, by collecting a predetermined number of the coins, grants the privilege of acquiring a rare item, the privilege of playing gacha, or the like.

4.4.6. Processing after Matching Match-Up 4: Setting Equipment Acquisition Period After the end of a matching match-up, the matching match-up managing unit 106 may execute processing of enabling a winning matched player to preferentially acquire equipment of a losing matched player.

In this case, the matching match-up managing unit 106 may automatically allow the winning matched player to acquire the equipment or, based on an instruction by the winning matched player, allow the winning matched player to select and acquire only desired equipment.

In addition, the matching match-up managing unit 106 executes processing of providing a period (for example, 30 seconds) during which the winning matched player is allowed to preferentially acquire equipment in the possession of a losing player character by, for example, making the equipment in the possession of the losing player character only visually recognizable by the winning matched player.

It should be noted that, after the selection of equipment or the end of the period during which the winning matched player is allowed to preferentially acquire the equipment, the matching match-up managing unit 106 executes various processes provided to an unmatched player.

4.4.7. Processing after Matching Match-Up 5: Setting Battle Moratorium Period After the end of the matching match-up, the matching match-up managing unit 106 may set, with respect to a matched player who did not lose, a period (hereinafter, also referred to as a "battle moratorium period") during which interference such as an attack from other matched players is disabled.

In this case, the matching match-up managing unit 106 may variably set the battle moratorium period in accordance with a type or a used amount of a recovery item owned by the matched player or a type of an item to replace a currently-used attack item (in other words, a type of a replacement item) or the matching match-up managing unit 106 may set the battle moratorium period as a period determined in advance (however, the period may fluctuate in accordance with an elapsed time from the start of the game).

4.5. Modifications

Next, modifications of a remedial processing or a recurrence prevention processing according to one embodiment of the invention will be described.

4.5.1. Modification 1: Matching Match-Up Control Processing

While the matching match-up managing unit 106 executes various processes for continuously executing match-ups with respect to a status prior to matching such as the number of or types of items or points as described above, the matching match-up managing unit 106 may execute matching match-up control processing based on special specifications such as limiting items used by a player with an extensive match-up history (the number of match-ups) of individual match-ups or group match-ups.

In other words, when there is a difference in capabilities or a difference in abilities between matched players or matched player characters such as when a difference in game levels is at least a certain level, a difference in capabilities including items is at least a certain level, or a difference in the numbers of match-ups is at least a certain value, the matching match-up managing unit 106 may provide a limit to the items or capabilities used by a matched player with high capability or high ability or specially offer a usable item or capability to a matched player with low capability or low ability.

For example, when the difference in game levels between matched players is 3 levels or more, the matching match-up managing unit 106 executes the matching match-up control processing by increasing an energy parameter value of the matched player with the lower game level by +30%.

It should be noted that, as described above, the matching match-up managing unit 106 is basically configured to restore a capability limited or added during a matching match-up to an original state after the end of the matching match-up. Alternatively, the matching match-up managing unit 106 may maintain a state of a capability originally limited or added only during a matching match-up even after the end of the matching match-up in accordance with a result of the matching match-up such as maintaining a limited capability when losing the matching match-up (on the premise of being able to continue the match-up game even after the loss) or maintaining an added capability when winning the matching match-up.

4.5.2. Modification 2: Matching Processing Based on Application from Player The matching match-up managing unit 106 may execute matching match-up control processing with a matched player determined by the matching processing based on an application by a player (hereinafter, referred to as a "match-up-requesting player") who requests a matching match-up between matched players.

In other words, the matching processing unit 105 executes matching processing based on an application by a match-up-requesting player who requests a match-up between matched players.

In particular, the matching processing unit 105 executes the matching processing in response to an application by the match-up-requesting player and forcibly determines a matched player or determines a matched player under the consent by a matched player having been matched by the matching processing in addition to the application by the match-up-requesting player.

In addition, the matching match-up managing unit 106 may execute matching match-up control processing for performing a matching match-up with the determined matched player.

When applications are made at a same timing from a plurality of match-up-requesting players, the matching processing unit 105 may determine one matched player (one group) in accordance with a relationship (a relationship between levels or a difference in capabilities) between the match-up-requesting players and another matched player who has been matched or may randomly determine one matched player (one group).

Furthermore, in the case of a matching match-up between teams constituted by a plurality of matched player groups, a configuration may be adopted in which either an application can only be made by a player determined as a team leader or an application can be made from any of the players belonging to the team.

Moreover, with respect to such an application, a configuration may be adopted in which either an application can be made anytime during a game or a predetermined period is set when a predetermined condition is satisfied (when player characters of a same team lose in (exit from) a team match-up) and an application is only accepted during this period.

4.5.3. Modification 3: Suspension of Matching Match-Up Based on Relationship with Matched Player When an application for a matching match-up is made from a match-up-requesting player as described above, the matching match-up managing unit 106 may:

(A1) execute determination processing of determining whether or not a given match-up feasible condition is satisfied, the match-up feasible condition being based on a relationship between the match-up-requesting player and another matched player who had been matched by the matching processing or a relationship between a player group to which the match-up-requesting player belongs and another matched player group which had been matched by the matching processing; and (A2) when it is determined in the determination processing that the match-up feasible condition is not satisfied, execute suspension processing of suspending the matching match-up control processing in order to suspend the matched match-up or execute inquiry processing for making an inquiry to at least any one of the match-up-requesting player and the other matched player about whether or not the matching match-up is to be executed.

For example, in the case of an inter-individual match-up, the matching match-up managing unit 106 executes determination processing of determining whether or not capabilities are the same (including similar levels) based on game levels, same capabilities (experience point, offensive capability, defensive capability, or two or more of these elements), same equipment capabilities (offensive capability of item, defensive capability of item, or both), or two or more of these capabilities.

In addition, when it is determined that capabilities are the same (including similar levels) by the determination processing described above, the matching match-up managing unit 106 may execute the matching match-up control processing, but otherwise may execute the suspension processing of forcibly suspending the matching match-up control processing or may execute the inquiry processing.

4.5.4. Modification 4: Addition Processing of Matched Player and the Like when Generating Matching Match-Up Region When the matching match-up managing unit 106 generates a matching match-up region in the matching match-up control processing as described above, when an unmatched player character is present in the matching match-up region, the matching match-up managing unit 106 may change the unmatched player character to a matched player character and add a player character of the player as a matched player character who is a control object in the matching match-up control processing or rearrange the unmatched player character to a region outside of the matching match-up region (in other words, a non-matching match-up region).

4.5.5. Modification 5: Control of Successive Matching Match-Ups

The matching match-up managing unit 106 may successively execute matching match-ups as long as any one of same matched players has not lost and, in this case, a rest period (in other words, a cool-down time) of a predetermined period (for example, 1 minute) may be provided between matching match-ups.

In this case, when each matched player has not lost after the end of one matching match-up (when a cool-down time is provided, during the cool-down time), the matching match-up managing unit 106 may:

(B1) inquire with each matched player as to whether or not a matching match-up is to be executed once again and successively execute the matching match-up control processing when both matched players wish to do so; or (B2) successively execute the matching match-up control processing unless at least any of the matched players expresses withdrawal from the matching match-up.

In the case described above, as a general rule, the matching match-up managing unit 106 preferably inhibits applications for a matching match-up from players other than the matched players or inhibits applications by the matched players for a matching match-up to the other players during the cool-down time.

In addition, only control of matching match-up control processing is not started during the cool-down time, and the game managing unit 103 may execute control related to inter-individual match-ups (control related to match-ups other than the matching match-up control processing) such as an attack from the matched players or players other than the matched players or an attack on the matched players or other players.

Furthermore, in a case where control related to inter-individual match-ups is being executed during the cool-down time, when the matched players are not launching an attack on other players (including other matched players) or subjected to an attack from the other players, the matching match-up managing unit 106 may accept an application for a matching match-up from other players or an application for a matching match-up with the other players even during the cool-down time.

5. Operations

Next, operations of the matching match-up control processing including the parameter control processing and the parameter control disabling processing which is executed by the server 10 will be described with reference to FIG. 8.

Figure 8:
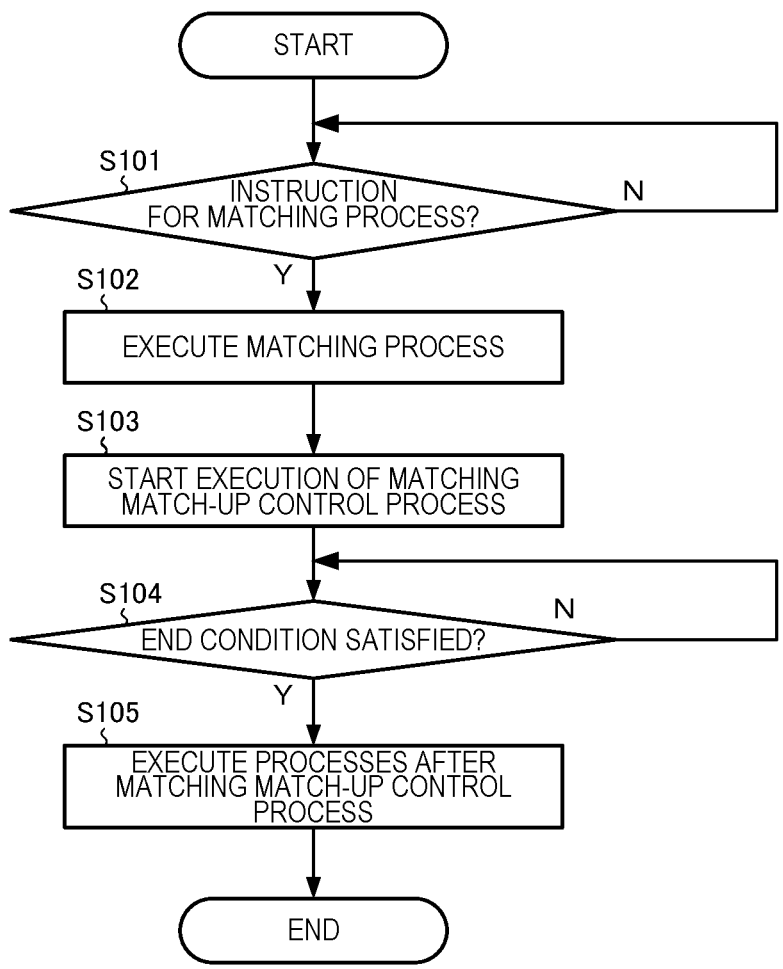
FIG. 8 is a flow chart illustrating operations of matching match-up control processing including parameter control processing and parameter control disabling processing which is executed by a server according to the embodiment of the invention.

FIG. 8 is a flow chart illustrating operations of the matching match-up control processing including the parameter control processing and the parameter control disabling processing which is executed by the server 10.

In the operations, it is assumed that a match-up game with a battle royale format by a plurality of players has already been executed and that necessary player information of each player has already been registered in the player information storage unit 146 and the player information is updated from time to time.

In addition, it is assumed that the operations represent control processing when executing the matching match-up control processing with respect to an individual match-up.

First, the matching processing unit 105 receives an instruction at a given timing to start matching processing by a specific player which is an instruction input by the specific player or an instruction issued by a computer (step S101), and executes the matching processing of determining a matched player from other players (step S102).

Next, the matching match-up managing unit 106 sets a matching match-up region and starts matching match-up control processing between matched players using matched player characters including parameter control disabling processing as interference inhibiting processing (step S103).

At this point, when interference from a matched player character to another matched player character occurs, the parameter control unit 107 executes parameter control processing with respect to the matched player character having been subjected to the interference in accordance with the interference.

Next, the matching match-up managing unit 106 determines whether or not the matching match-up end condition has been satisfied (step S104), and when it is determined that the matching match-up end condition has been satisfied, the matching match-up managing unit 106 executes processes after the matching match-up control processing (step S105) and ends the present operations.

6. Other

The invention is not limited to the embodiments described above and various modifications can be made thereto. For example, any term cited with a different term having a broader meaning than or the same meaning as the term at least once in the description or the drawings may be replaced by the different term in any place in the description or the drawings.

Embodiments of the invention may provide terminals 20 with each game using a single server 10 or may cause a plurality of servers 10 to operate in conjunction with one another to construct a server system and have the server system provide the terminals with each game.

Furthermore, while a game provided by the server 10 is being executed by the terminal 20 in the embodiments described above, the game described above may be realized by having the server 10 execute each function of the processing unit 200 of the terminal 20 with the exception of operation input and execute a game program and having the terminal 20 execute operation input and image display by streaming.

In addition, the embodiments of the invention may be realized by a single game apparatus having the functions of the server 10 or, in other words, an apparatus (stand-alone) which operates independently without relying on other devices such as a server and, in this case, a plurality of input terminals need only be available.

Furthermore, such a game terminal may be connected in plurality in a wired or wireless manner, and a single game apparatus can be realized by a plurality of game apparatuses o function as the server 10.

Moreover, while the game system according to the invention is applied to the server 10 which executes the game system in conjunction with the terminal 20 via a network in the embodiments described above, the game system can also be applied as a tablet-type information terminal, a personal computer, or a game apparatus installed at an amusement park.

The invention includes configurations that are substantially the same (for example, in function, method, and results, or in objective and effects) as the configurations described in the embodiments. The invention also includes configurations in which non-essential elements described in the embodiments are replaced by other elements. The invention also includes configurations having the same effects as those of the configurations described in the embodiments, or configurations capable of achieving the same objectives as those of the configurations described in the embodiments. The invention further includes configurations obtained by adding known art to the configurations described in the embodiments.

Some embodiments of the invention have been described in detail above, but a person skilled in the art will readily appreciate that various modifications can be made from the embodiments without materially departing from the novel teachings and effects of the invention. Accordingly, all such modifications are assumed to be included in the scope of the invention.

What is claimed is:

1. A game system which executes a match-up game among a plurality of players using player characters set in a game space and which provides a terminal with information related to the match-up game, the game system comprising a processor programmed to:
   execute parameter control processing of controlling a given parameter value stored in storage for each player character of each player in accordance with interference from the player character of another player during the execution of the match-up game;
   execute matching processing at a given timing during the execution of the match-up game, the matching processing involving (A) matching at least two or more players or player groups from the plurality of players or a plurality of player groups constituted by the plurality of players, and determining the players or the player groups who have been matched as matched players or (B) matching at least two or more player characters or player character groups from a plurality of the player characters or a plurality of player character groups constituted by the plurality of player characters, and determining the player characters or player character groups who have been matched as matched player characters;
   execute, as matching match-up control processing, (a) control processing related to a match-up that uses the player characters as matched player characters between matched players determined by the matching processing or (b) control processing related to the match-up that uses matched player characters determined by the matching processing;
   when interference from one of the matched player characters to another matched player character occurs during the execution of the matching match-up control processing, execute the parameter control processing with respect to the matched player character having been subjected to the interference in accordance with the interference; and
   execute parameter control disabling processing of disabling control of the parameter value in accordance with the interference to the matched player character from the player character of an unmatched player who differs from the matched player during the execution of the match-up control processing.

2. The game system according to claim 1, wherein
the processor is programmed to execute the parameter control disabling processing that involves:
   generating a matching match-up region in which the matched player characters are present and from which the unmatched player character has been excluded in the game space; and
   disabling at least one kind of processing of movement control processing and influence control processing, the movement control processing controlling a movement of an object from a non-matching match-up region that differs from the matching match-up region to the matching match-up region in the game space, the influence control processing controlling exercise of influence from the non-matching match-up region to the matching match-up region in the game space.

3. The game system according to claim 2, wherein
the processor is programmed to cause the terminal to display the matching match-up region in order to distinguish from other regions in the game space.

4. The game system according to claim 1, wherein
the processor is programmed to end the matching match-up control processing and the parameter control disabling processing when a given matching match-up end condition is satisfied during the execution of the matching match-up control processing.

5. The game system according to claim 1, wherein
the processor is programmed to rearrange, when the matching match-up control processing ends, the matched player characters at a position that differs from a position in the game space where the matching match-up based on the matching match-up control processing had been executed.

6. The game system according to claim 1, wherein
the processor is programmed to execute the matching match-up control processing with the matched players or the matched player characters determined by the matching processing based on an application by a match-up-requesting player who requests the match-up between the matched players who have been matched or between the matched players indicating players who operate the matched player characters.

7. The game system according to claim 6, wherein
the processor is programmed to:
   execute determination processing of determining whether or not a given match-up feasible condition is satisfied, the given match-up feasible condition being based on a relationship between the match-up-requesting player and another matched player who has been matched, or a relationship between the player group to which the match-up-requesting player belongs and another matched player group which has been matched; and
   when it is determined in the determination processing that the match-up feasible condition is not satisfied, execute suspension processing of suspending the matching match-up control processing in order to suspend the matched match-up, or execute inquiry processing for making an inquiry to at least any one of the match-up-requesting player and the other matched player about whether or not the matching match-up is to be executed.

8. The game system according to claim 1, wherein the processor is programmed to change, as the matching match-up control processing, a type or contents of the match-up game in the matching match-up in accordance with a type of the matched player or the matched player character, or in accordance with a parameter value.

9. A method of executing a match-up game among a plurality of players using player characters set in a game space and providing a terminal with information related to the match-up game, the method of providing information related to a match-up game comprising:

executing parameter control processing of controlling a given parameter value stored in storage for each player character of each player in accordance with interference from the player character of another player during the execution of the match-up game;

executing matching processing at a given timing during the execution of the match-up game, the matching processing involving (A) matching at least two or more players or player groups from the plurality of players or a plurality of player groups constituted by the plurality of players, and determining the players or the player groups who have been matched as matched players or (B) matching at least two or more player characters or player character groups from a plurality of the player characters or a plurality of player character groups constituted by the plurality of player characters and determining the player characters or player character groups who have been matched as matched player characters;

executing, as matching match-up control processing, (a) control processing related to a match-up that uses the player characters as matched player characters between matched players determined by the matching processing or (b) control processing related to the match-up that uses matched player characters determined by the matching processing;

when interference from one of the matched player characters to another matched player character occurs during the execution of the matching match-up control processing, executing the parameter control processing with respect to the matched player character having been subjected to the interference in accordance with the interference; and executing parameter control disabling processing of disabling control of the parameter value in accordance with the interference to the matched player character from the player character of an unmatched player who differs from the matched player during the execution of the match-up control processing.

10. A game system which executes a match-up game among a plurality of players using player characters set in a game space, the game system comprising a processor, programmed to:

execute parameter control processing of controlling a given parameter value stored in storage for each player character of each player in accordance with interference from the player character of another player during the execution of the match-up game, execute matching processing at a given timing during the execution of the match-up game, the matching processing involving (A) matching at least two or more players or player groups from the plurality of players or a plurality of player groups constituted by the plurality of players, and determining the players or the player groups who have been matched as matched players or (B) matching at least two or more player characters or player character groups from a plurality of the player characters or a plurality of player character groups constituted by the plurality of player characters and determining the player characters or player character groups who have been matched as matched player characters;

execute, as matching match-up control processing, (a) control processing related to a match-up that uses the player characters as matched player characters between matched players determined by the matching processing or (b) control processing related to the match-up that uses matched player characters determined by the matching processing, when interference from one of the matched player characters to another matched player character occurs during the execution of the matching match-up control processing, the game system execute the parameter control processing with respect to the matched player character having been subjected to the interference in accordance with the interference, and the game system execute parameter control disabling processing of disabling control of the parameter value in accordance with the interference to the matched player character from the player character of an unmatched player who differs from the matched player during the execution of the match-up control processing.

* * * * *